United States Patent [19]
Soeya et al.

[11] Patent Number: 5,726,838
[45] Date of Patent: Mar. 10, 1998

[54] MAGNETIC DISC APPARATUS WITH HEAD HAVING MAGNETO-RESISTANCE EFFECT

[75] Inventors: Susumu Soeya, Hitachiota; Shigeru Tadokoro, Hitachi; Takao Imagawa, Hitachi; Akira Kumagai, Hitachi; Moriaki Fuyama, Hitachi; Shinji Narishige, Mito, all of Japan

[73] Assignee: Hitachi, Ltd., Tokyo, Japan

[21] Appl. No.: 400,457

[22] Filed: Mar. 7, 1995

Related U.S. Application Data

[63] Continuation of Ser. No. 947,261, Sep. 18, 1992, abandoned.

[30] Foreign Application Priority Data

Sep. 18, 1991 [JP] Japan .................. 3-237842
Feb. 17, 1992 [JP] Japan .................. 4-059895

[51] Int. Cl.$^6$ .................................................. G11B 5/31
[52] U.S. Cl. ........................................................ 360/113
[58] Field of Search ............................................ 360/113

[56] References Cited

U.S. PATENT DOCUMENTS

| | | |
|---|---|---|
| 3,840,898 | 10/1974 | Bajorek et al. .................. 360/113 |
| 4,103,315 | 7/1978 | Hempstead et al. .............. 360/110 |
| 4,663,685 | 5/1987 | Tsang ............................... 360/113 |
| 5,005,096 | 4/1991 | Krounbi et al. .................. 360/113 |
| 5,014,147 | 5/1991 | Parkin et al. ..................... 360/113 |

*Primary Examiner*—Stuart S. Levy
*Assistant Examiner*—David D. Davis
*Attorney, Agent, or Firm*—Antonelli, Terry, Stout, & Kraus, LLP

[57] ABSTRACT

A magnetic disc apparatus capable of noiseless, high-output reproduction is disclosed. A magnetic head including a magnetic domain control structure having an antiferromagnetic film for applying a longitudinally biasing magnetic field to a magneto-sensitive portion of a magneto-resistance effect film, and a magnetic film smaller in spontaneous magnetization than the magneto-resistance effect film, which magnetic film is interposed between the magneto-resistance effect film and the antiferromagnetic film. A magnetic disc apparatus is thus realized which is high in recording density and usable in stable manner within the operating temperature range.

18 Claims, 11 Drawing Sheets

MAGNETIC DISC APPARATUS WITH HEAD HAVING MAGNETO-RESISTANCE EFFECT

This application is a continuation of Ser. No. 07/947,261, filed Sep. 18, 1992, now abandoned.

BACKGROUND OF THE INVENTION

The present invention relates to magnetic disc apparatus with a head of magneto-resistance effect type mounted thereon, or more in particular to a magnetic disc apparatus capable of noiseless reproduction with high sensitivity.

In the prior art apparatus disclosed in U.S. Pat. No. 4,103,315, an antiferromagnetic layer is formed over the whole surface of a magneto-resistance effect film.

U.S. Pat. No. 4,663,685, on the other hand, discloses the art of forming an antiferromagnetic layer at the end of a magneto-resistance effect film.

The above-described conventional methods, in which an antiferromagnetic layer is formed in direct contact with a magneto-resistance effect film, pose the problem that although Barkhausen noises are suppressed, an extremely large coupling magnetic field leads to a deteriorated magnetic response characteristic of the magnetic head, i.e., a deteriorated reproduction sensitivity.

SUMMARY OF THE INVENTION

Accordingly, the object of the present invention is to provide a magnetic disc apparatus with a high-output magnetic head of magneto-resistance effect type having a an improved magnetic response characteristic and a suppressed Barkhausen noise.

According to the present invention, there is provided a magnetic disc apparatus comprising a magnetic disc adapted to rotate with the peripheral speed increased progressively toward an outer periphery, a magnetic head for converting the magnetic signal recorded in the magnetic disc into an electric signal by use of the magneto-resistance effect, and means for suppressing the base line fluctuations of the electrical signal produced from the magnetic disc.

The base line fluctuation of the electrical signal is desirably not more than 3%, or more desirably 2% to 0.01% of the peak value of the electrical signal.

The base line fluctuation is the amount of shift from a zero point of a reproduction signal in the absence of a magnetic signal from the magnetic disc, which reproduction signal is normally assumed to be zero in the absence of such a magnetic signal. Further, the base line fluctuation amount is defined as the shift amount from the zero point divided by the peak value of the electrical signal and multiplied by 100, and is expressed in percentage.

The inventors have discovered that the base line fluctuation is attributed to the Barkhausen noise generated when the magnetic head reads a magnetic signal from the magnetic disc. The present invention is based on the knowledge that realization of a magnetic disc apparatus capable of noiseless reproduction with high output requires that the magnetic head and/or a signal processing circuit include means for suppressing the above-mentioned noise.

According to the present invention based on this knowledge, there is provided a magnetic disc apparatus comprising means for suppressing the base line fluctuation of an electrical signal, and preferably, means for high-output reproduction at the same time.

According to another aspect of the present invention, there is provided a magnetic disc apparatus comprising a magnetic head including a magneto-resistance effect film for converting a magnetic signal into an electrical signal by use of the magneto-resistance effect and a pair of electrodes for supplying a signal detection current to the magneto-resistance effect film. A magnetic domain control layer is arranged in contact with the magneto-resistance effect film in the area between the electrodes. The magnetic domain control layer has a first magnetic film for applying a longitudinally biasing magnetic field to the magneto-resistance effect film by use of a magnetic coupling called the "magnetic exchange coupling" generated in the boundary with the magneto-resistance effect film and a second magnetic film formed between the first magnetic film and the magneto-resistance effect film for regulating the magnitude of magnetic coupling between the magneto-resistance effect film and the first magnetic film, i.e., the magnitude of the longitudinally biasing magnetic field to a desired value.

According to another aspect of the present invention, there is provided a magnetic disc apparatus in which the magnetic domain control layer of a magnetic head forms two magnetic exchange coupling, one between first and second magnetic films, and the other between the second magnetic film and a magneto-resistance effect film. As a result, a magnetic disc apparatus capable of noiseless reproduction with high output is realized.

More specifically, the longitudinally biasing magnetic field applied to a magneto-resistance effect film due to two magnetic exchange couplings causes a noiseless and high-output electrical signal produced from the magnetic disc. This is achieved by reducing the saturation magnetic flux density of the second magnetic film on the one hand and the magnitude of the longitudinally biasing magnetic field applied to the magneto-resistance effect film by the two magnetic exchange couplings from the first magnetic film to such an extent as to facilitate the rotation of the magnetic moment of the magneto-resistance effect film on the other hand.

According to a further aspect of the present invention, there is provided a magnetic disc apparatus in which the value of the longitudinally biasing magnetic field applied to the magneto-resistance effect film is reduced to facilitate the rotation of the magnetic moment in the magneto-resistance effect film to such an extent as to prevent generation of the Barkhausen noise in accordance with the desired surface recording density.

The first magnetic film for applying a longitudinally biasing magnetic field for suppressing the above-mentioned noise to the magneto-resistance effect film is desirably made of an antiferromagnetic film, a ferrimagnetic film or a permanent magnet film, of which the antiferromagnetic film or the permanent magnet film is most desirable. On the other hand, the second magnetic film for regulating the longitudinally biasing magnetic field between the magneto-resistance effect film and the first magnetic film is preferably made of a ferromagnetic film or a ferrimagnetic film, of which the former is more preferable.

The second magnetic film is preferably constructed of a magnetic film containing a ferromagnetic component. In other words, the second magnetic film is required to hold a spontaneous magnetization. This is because in the case where the second magnetic film is composed of a paramagnetic component such as a non-magnetic material, the magnetic exchange coupling between the magneto-resistance effect film and the first magnetic film is extinguished, thus making it impossible to apply a longitudinally biasing magnetic field to the magneto-resistance effect film.

Further, in order to attain a high output, the thickness of the second magnetic film is preferably smaller than that of the magneto-resistance effect film.

A magnetic disc apparatus capable of high-output noiseless reproduction with a high surface recording density is thus realized.

According to still another aspect of the present invention, there is provided a magnetic disc apparatus comprising means for producing the substantially same shape and/or peak value of an electrical signal for the same information with a change in ambient temperature at the time of reproducing the information recorded in the magnetic disc, taking into consideration the current supplied to the magneto-resistance effect film (hereinafter called "the sense current") and the distance between the magnetic head and the magnetic disc (hereinafter called "the air bearing surface").

The peak value fluctuation due to the temperature of the electrical signal is preferably not more than 5%, or most preferably between 4% and 0.01% within the range of operating temperature.

The inventors have discovered that in order to make possible reproduction with substantially the same shape and/or peak value of an electrical signal for the same information from the magnetic disc even with a change in ambient temperature, means should be inserted for maintaining an easy rotation of the magnetic moment of the magneto-resistance effect film within the operating temperature range. The present invention is based on this knowledge.

According to a still further aspect of the present invention, there is provided a magnetic disc apparatus comprising a magnetic head including a magneto-resistance effect film for converting a magnetic signal into an electrical signal by use of the magneto-resistance effect and a pair of electrodes for supplying a signal detection current to the magneto-resistance effect film, a magnetic domain control layer disposed in contact with the magneto-resistance effect film in the area between the electrodes, and means for maintaining a constant magnitude of the longitudinally biasing magnetic field applied from the magnetic domain control layer to the magneto-resistance effect film within the operating temperature range in order to secure a constant ease of rotation of the magnetic moment of the magneto-resistance effect film within the operating temperature range.

Specifically, the temperature dependency of the magnitude of the longitudinally biasing magnetic field of the magneto-resistance effect film and the magnetic domain control layer of the magnetic head mounted on the magnetic disc apparatus is reduced within the operating temperature range. Further, the longitudinally biasing magnetic field at room temperature is decreased, while the temperature at which the magnetic exchange coupling between the magnetic domain control layer and the magneto-resistance effect film is eliminated, i.e., the blocking temperature is increased as compared with the operating temperature range.

According to a further aspect of the present invention, there is provided a magnetic disc apparatus comprising a magnetic head including a magneto-resistance effect film for converting a magnetic signal into an electrical signal by use of the magneto-resistance effect and a pair of electrodes for supplying a signal detection current to the magneto-resistance effect film, and a magnetic domain control layer inserted in contact with the magneto-resistance effect film in the area between the electrodes, wherein the magnetic domain control layer has an antiferromagnetic film and a magnetic film formed between the antiferromagnetic film and the magneto-resistance effect film, and the spontaneous magnetization of the antiferromagnetic film is smaller than that of the magnetic film.

According to another aspect of the present invention, there is provided a magnetic disc apparatus comprising a magnetic head including a magneto-resistance effect film for converting a magnetic signal into an electrical signal by use of the magneto-resistance effect and a pair of electrodes for supplying a signal detection current to the magneto-resistance effect film, and a magnetic domain control layer inserted in contact with the magneto-resistance effect film in the area between the electrodes, wherein the magnetic domain control layer has a permanent magnet film and a magnetic film formed between the permanent magnet film and the magneto-resistance effect film, and the spontaneous magnetization of the magnetic film is smaller than that of the magneto-resistance effect magnet film.

According to still another aspect of the present invention, there is provided a magnetic disc apparatus comprising a magnetic head including a NiFe film for converting a magnetic signal into an electrical signal by use of the magneto-resistance effect and a pair of electrodes for supplying a signal detection current to the NiFe film, and a magnetic domain control layer inserted in contact with the NeFe film in the area between the electrodes, wherein the magnetic domain control layer has a first film of CoPt or NiO and a second film of NiFeNb formed between the first film and the NeFe film.

The magnetic head mounted on the magnetic disc apparatus according to the present invention is a separated recording-reproduction magnetic head formed of a read-only reproduction head and a write-only recording head of electromagnetic induction type above the reproduction head.

When the information recorded in the magnetic disc is read by the reproduction head, a reproduction output is obtained five to ten times larger than when a magnetic head of electromagnetic induction type is used, for the same track width with the same air hearing surface and magnetic disc medium.

A recording head and a reproduction head separated from each other makes it possible to use a magnetic core material of high saturation magnetic flux density for the recording head, which in turn permits information to be written in the magnetic disc with a strong write magnetic field.

Also, the use of a magnetic disc medium having a high coercive force is made possible, thereby realizing a write operation with a large track density and a large linear recording density (also called "bit density").

Since the reproduction head increases the reproduction output, an electrical signal with a sufficient reproduction output is produced with a small track width of the magnetic head. In addition, the electrical signal is noiseless. By increasing the linear recording density, on the other hand, a sufficient reproduction output is obtained.

As a result, both the track density and the linear recording density of a magnetic disc are improved, thereby realizing a large-capacity magnetic disc apparatus with high recording density.

Also, the fact that an electrical signal obtained by use of a reproduction head is made noiseless enables instantaneous processing of the resulting electrical signal, thereby leading to a magnetic disc apparatus free from a signal processing circuit such as a noise processing circuit. Since the extra time which otherwise would be consumed in a signal processing circuit is saved, the data transfer speed is improved at the time of reproduction.

Furthermore, a large linear recording density is another factor contributing to an increased data transfer speed for reproduction.

In addition, a noiseless electrical signal reduces the access time.

Another advantage of the invention is that the reproduction output of the reproduction head does not depend on the peripheral speed of the disc and therefore a large reproduction output is maintained with a reduced magnetic disc diameter. As a result, a high-output electrical signal is produced with a small magnetic disc diameter. A sufficient reading operation is also secured with a recording density increased to such an extent as to satisfy a capacity required of a small-sized magnetic disc apparatus, thus realizing a magnetic disc apparatus with a very small magnetic disc diameter.

A magnetic disc apparatus is thus realized, comprising a magnetic disc 1.5 to 6.5 inches in diameter, rotary means for rotating the magnetic disc at the rate of 3500 to 5000 rpm and a magnetic head for converting the magnetic signal recorded in the magnetic disc into an electrical signal by a magneto-resistance effect film, wherein the information recorded in the magnetic disc with a track density of 2.6 to 20.0 ktpi and a bit density of 60 to 200 kbpi is reproduced with a transfer speed of 6 to 9 MB/s and an access time of 5 to 10 ms.

What is more, a small-sized magnetic disc apparatus is realized with a magnetic head for converting a magnetic signal recorded in the magnetic disc of 1.5 to 3.0 inches in diameter into an electrical signal using the magneto-resistance effect.

BRIEF DESCRIPTION OF THE DRAWINGS

These and other objects and technical advantages of the present invention will be readily apparent from the following description of the preferred exemplary embodiment(s) of the invention in conjunction with the accompanying drawings, in which.

DESCRIPTION OF THE PREFERRED EMBODIMENTS

An embodiment of the present invention will be described below.

Figure 2:
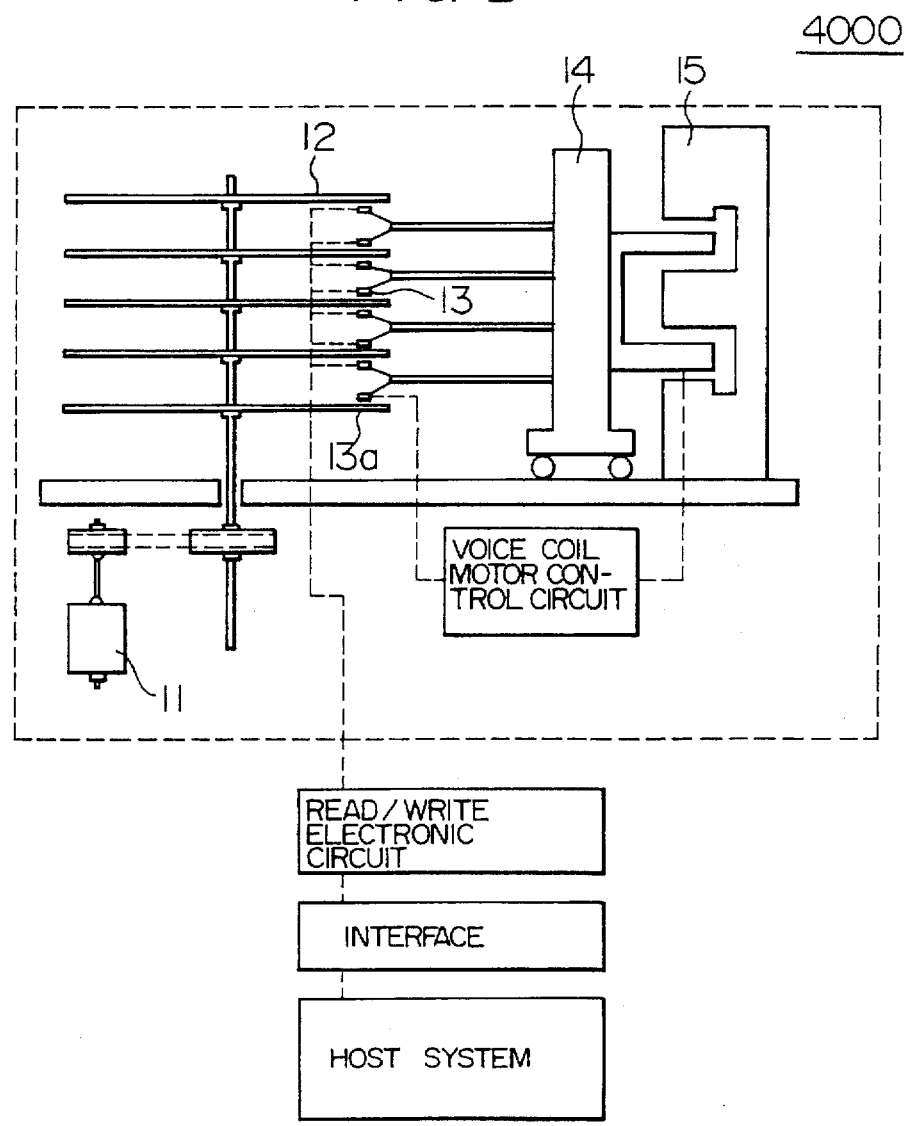
FIG. 2 is a schematic diagram showing a configuration of a magnetic disc apparatus and an information processing system.

FIG. 2 is a schematic diagram showing a configuration of a magnetic disc apparatus 4000 according to an embodiment of the present invention. As shown in FIG. 2, the magnetic disc apparatus 4000 comprises a plurality of magnetic discs 12 layered equidistantly on an axis (spindle), a motor 11 for driving the spindle, a magnetic head group 13 held on a movable carriage 14, a voice coil motor 15 for driving the carriage 14, and a base for supporting them. The apparatus also comprises a voice coil motor control circuit for controlling the voice coil motor 15 in accordance with a signal sent from a host system such as a magnetic disc control device. The apparatus further comprises a read/write circuit having the functions of converting the data sent from a host system into a current to be supplied to the magnetic head in accordance with the write method and amplifying and converting the data sent from the magnetic disc 13 into a digital signal. The read/write circuit is connected to a host system through an interface.

Now, the operation of the magnetic disc apparatus 4000 will be described with reference to the reading mode. An instruction on the data to be read is applied to the voice coil motor control circuit through the interface from a host system. In accordance with a control current from the voice coil motor control circuit, the voice coil motor 15 drives the carriage 14, and moves the magnetic head group 13 accurately to position on the track which stores the data given as an instruction. This positioning process is effected by a positioning magnetic head 13a which is connected with the voice coil motor control circuit for detecting the position on the magnetic disc 12 and controlling the position of the data magnetic head 13. Also, the motor 11 supported by the base rotates a plurality of magnetic discs 12 mounted on the spindle. As the next step, in accordance with a signal from the write/read circuit, a predetermined magnetic head is selected, and a head position of a designated region is detected, after which the data signal is read from the magnetic disc. This reading operation is performed by the data magnetic head 13 connected to the write/read circuit exchanges signals with the magnetic disc 12. The data thus read out is converted into a predetermined signal and supplied to the host system.

The track density of a magnetic disc according to the present invention is 2600 to 20000 tracks per inch. The linear recording density is 65 to 200 kilobits per inch. The surface recording density determined as the product of the above-mentioned figures may be given as 170 to 4000 megabits per square inch.

Figure 6:
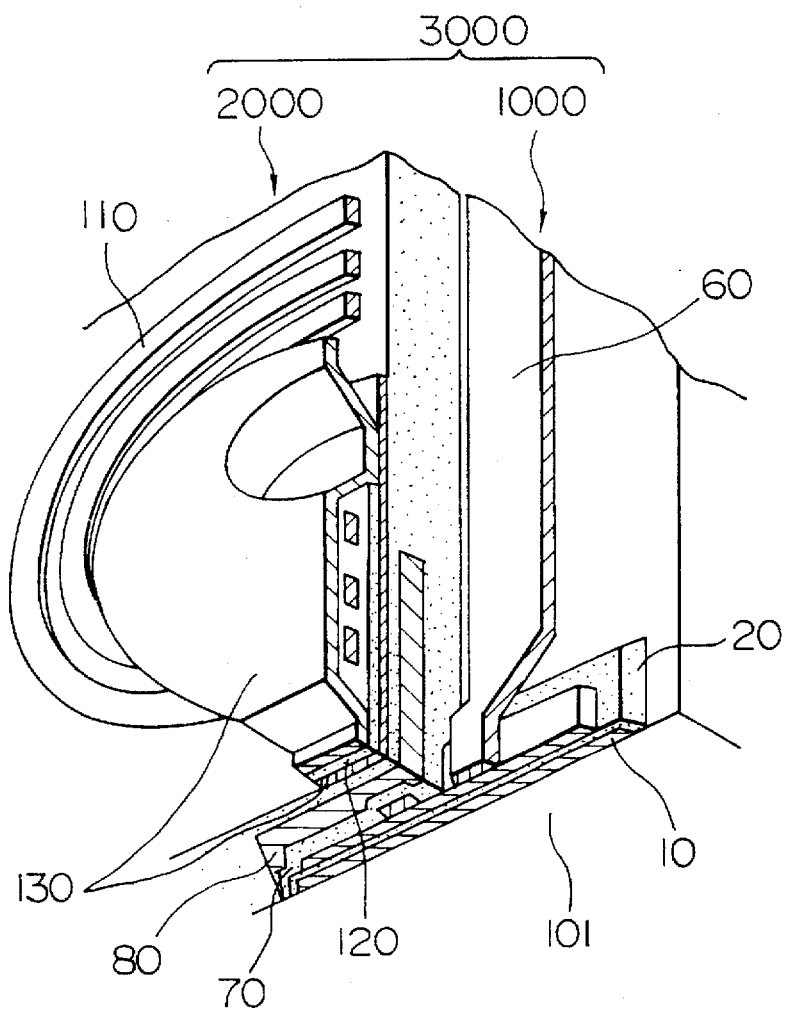
FIG. 6 is a perspective view showing a dual head according to an embodiment of the present invention.

The magnetic head mounted on a magnetic disc apparatus according to the present invention comprises a dual head 3000 as shown in FIG. 6. The dual head 3000 has the recording operation performed by a magnetic head of electromagnetic induction type 2000 and the reproduction by a magnetic head of magneto-resistance effect type (hereinafter called "the MR head") 1000.

According to the present invention, the reproduction output per unit track width of the MR head 1000 is secured in a magnitude five to ten times as large as the conventional thin film magnetic head of electromagnetic induction type used for both recording and reproduction. In addition, the present invention has a great advantage in that the reproduction output does not depend on the peripheral speed of the magnetic disc.

Further, the above-mentioned advantage makes it possible to maintain a high reproduction output even when the track width of the MR head is reduced, i.e., even when the track density of the magnetic disc medium is increased. Also, a high reproduction output is maintained even if the linear recording density of the magnetic disc medium is increased.

Another advantage of the present invention resides in that the Barkhausen noise likely to be generated in the electrical signal from the magnetic disc at the time of reproduction is suppressed, and the base line fluctuation of the reproduced waveform generated due to the noise for any disc rpm, sense current or air bearing surface is kept to not more than 3%, with the result that a noiseless electrical signal is produced while reproducing information with high sensitivity by securing a high S/N ratio.

Further, according to the present invention, an electrical signal which is stable, high in output and noiseless is produced within the operating temperature range.

Furthermore, according to the present invention, the recording head and the reproduction head are separated from each other, so that the magnetic core member 130 of the recording head 2000 is made of a material holding a high saturation magnetic flux density Bs, thus increasing and sharpening the write magnetic field and making possible the recording with a high linear recording density. Also, a high write magnetic field can be maintained and recording is possible with a high track density even with a reduced track width. This also permits an increased coercive force of the magnetic disc medium.

For the reason mentioned above, a magnetic disc apparatus including the MR head 1000 according to the present invention is configured. Thus a magnetic disc apparatus is realized which is capable of a high-output, noiseless reproduction without regard to the disc size.

Due to the configuration mentioned above, a high-density recording is made possible without regard to the size of the magnetic disc. Even when the disc diameter of the magnetic disc apparatus according to the present invention is as small as 1.5 to 6.5 inches, the recording and reproduction is possible with a magnetic disc speed of 3500 to 5000 rpm, a track density of 2.6 to 20.0 ktpi and a linear recording density of 60 to 200 ktpi, thus realizing a magnetic disc apparatus with a surface recording density of 170 to 4000 megabits per square inch.

Still another advantage of the present invention is that the capacity requirement of a small magnetic disc apparatus is fully met, so that the sufficient reading and writing operation is attained with a high bit density, a high track density and a disc size as small as 1.5 to 3.0 inches. The reduced disc size in turn realizes a large-capacity small magnetic disc apparatus.

The utility would remain low if the data transfer speed is decreased correspondingly even if the recording density and the information memory capacity are increased. The data transfer speed is higher, the higher the linear recording density. According to the present invention, the linear recording density can be increased to 60 to 200 kilobits per inch for an increased transfer speed.

Still another advantage of the present invention is that a high Bs material is used for the magnetic core member 130 of the recording head 2000, whereby the number of turns of the conductor coil 110 is reduced without sacrificing the strength of the write magnetic field (FIG. 6). As a result, the inductance of the recording head 2000 is reduced with a sufficient information writing operation made possible at high frequencies.

Also, the reproduction output of the MR head is not dependent on the peripheral speed, and thus information can be read at high frequencies.

The electrical signal obtained by use of the MR head 1000 according to the present invention is free of noises. As a consequence, the electrical signal can be converted into a digital signal directly without being processed through a specific circuit for dealing with the Barkhausen noise.

According to the present invention, a data transfer speed of 6 to 9 megabites/sec is attained.

The data access time (positioning time) is required to be reduced with the increase in data transfer speed, and according to the present invention, is desirably at 5 to 10 milliseconds.

The disc operating speed and the idle time of the magnetic head are preferably not less than 3500 rpm and an average of not more than 6 milliseconds respectively in view of the data transfer speed. The idle time means the time length during which the magnetic head that has moved to a predetermined track position remains stationary and waits for the magnetic disc rotation in order to write or read information into, or out of, the predetermined track position.

According to the present invention, a reduced size of the magnetic disc makes a high-speed seek operation possible, and in addition, the access time is decreased by suppressing the Barkhausen noise of the MR head 1000.

If the Barkhausen noise (base line fluctuation) occurs when a signal is read from the magnetic disc by the MR head, the data signal is required to be read from the magnetic disc surface again. In the process, the read operation is effected again in the above-mentioned cycles. Assuming that a magnetic disc apparatus is configured of an MR head generating the Barkhausen noise with the probability of 50%, for example, the access time is delayed by 1/30 seconds. According to the magnetic disc apparatus of the present invention, the suppression of the Barkhausen noise of the MR head improves the access time to 5 to 10 milliseconds.

Figure 3:
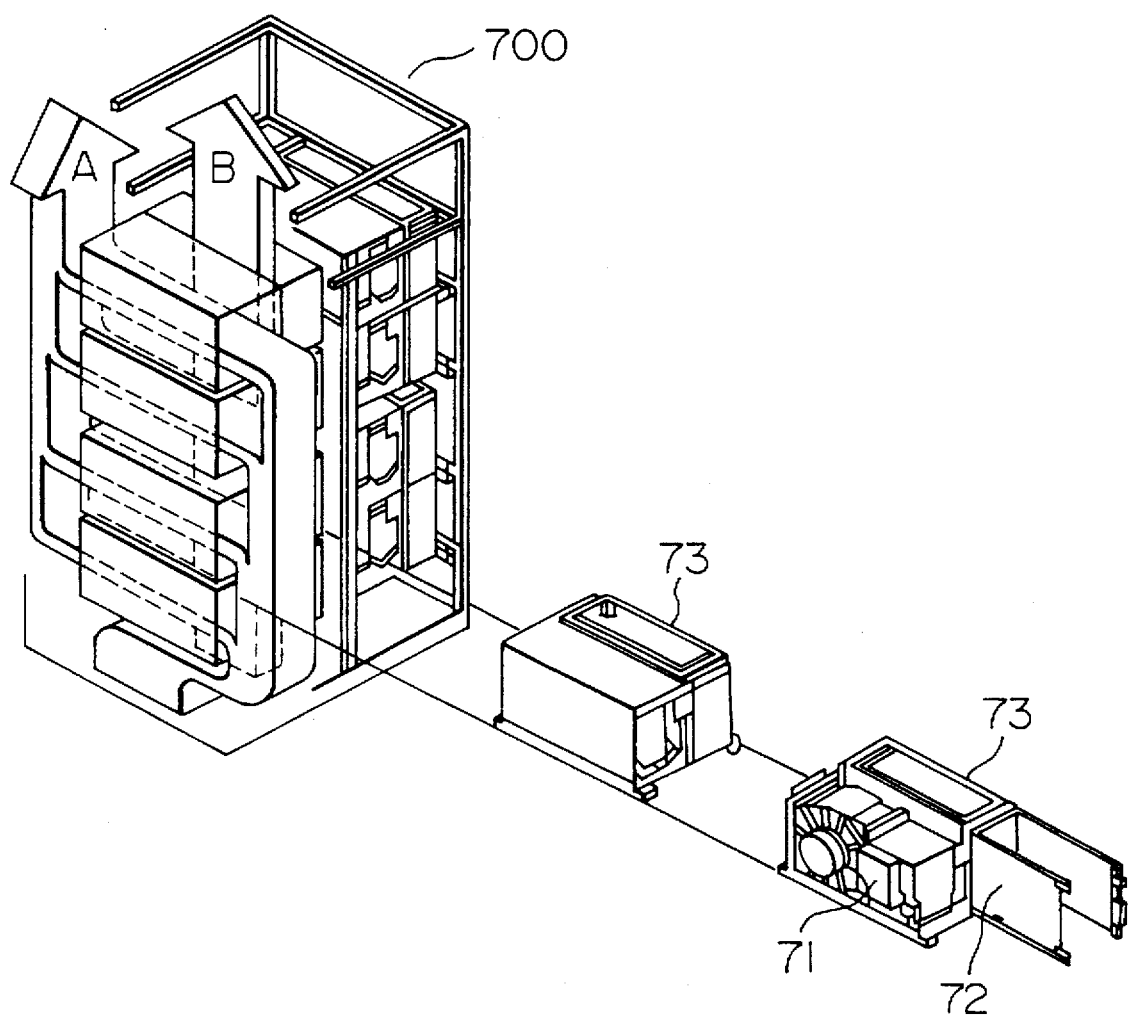
FIG. 3 is a perspective view of a magnetic disc apparatus according to an embodiment of the present invention.

A perspective view of a magnetic disc apparatus according to the present invention accommodated in a predetermined space is shown in FIG. 3.

A head disc assembly (HDA) 71 and an electronics circuit section 72 constitute a head disc assembly unit (HDU) 73, which is accommodated in a housing 700. The housing 700 has a bottom with a side 0.3 to 1.5 m long and is 0.2 to 2 m tall depending on the capacity of the apparatus. In FIG. 3, characters A and B designate the air flow for supplying clean air to the circuit boards in the HDA and HDU respectively.

Figure 4:
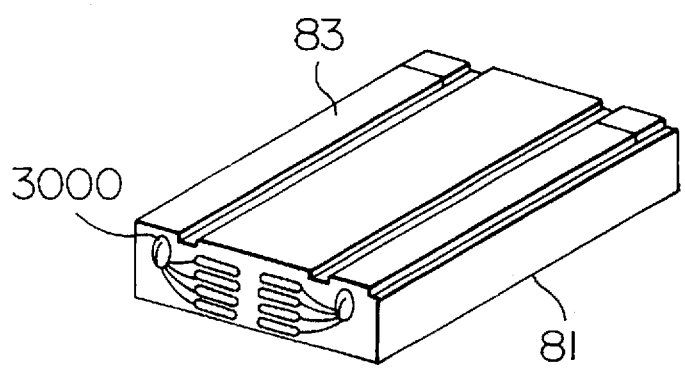
FIG. 4 is a perspective view showing a dual head, i.e., a magnetic head of a separated recording and reproduction type formed on a slider.

FIG. 4 is a perspective view showing a dual head formed on a predetermined slider according to the present invention. Numeral 81 designates a slider made of a non-magnetic ceramics as an example. Numeral 3000 designates a dual head, which has a shape as shown in detail in FIG. 6. Since the recording head is separated from the reproduction head, the magnetic head of this type has four current terminals. Numeral 83 designates a surface of the medium in opposed relation with the magnetic disc.

Figure 5:
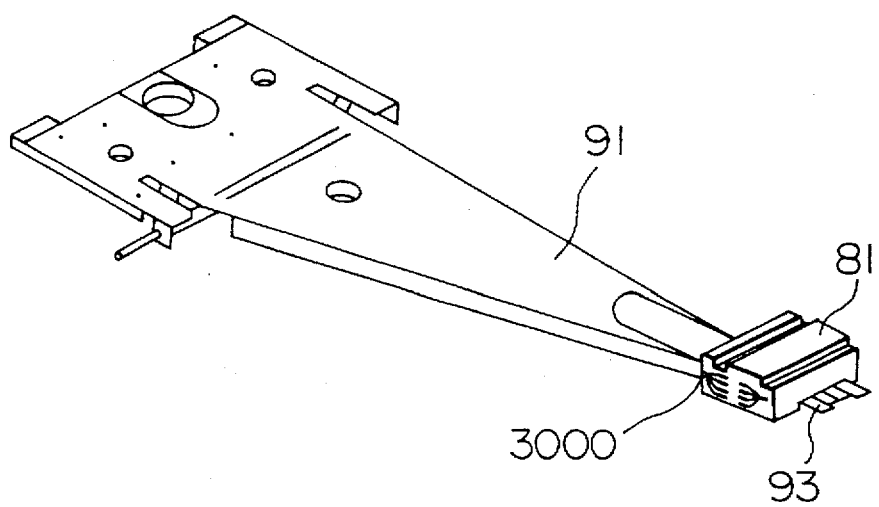
FIG. 5 is a perspective view of a slider formed on a load arm.

FIG. 5 is a perspective view showing a dual head with the slider of FIG. 4 formed on a load arm.

Numeral 91 designates a load arm supporting the slider 81. Numeral 93 designates a gimbal spring having the function of keeping a constant distance with the magnetic disc. The distance between the magnetic disc and the dual head 3000 formed at the forward end of the slider 81 in an energized state of the magnetic disc apparatus is generally called the air bearing surface and constitutes an important factor of the performance of a magnetic disc apparatus. In a magnetic disc apparatus according to the present invention, the air bearing surface can be maintained at 0.2 μm or less.

FIG. 6 shows a dual head 3000 mounted on a magnetic disc apparatus according to the present invention. A reproduction-only MR head 1000 is formed on a non-magnetic ceramics substrate 101, above which a recording-only recording head of electromagnetic induction type 2000 is arranged. In FIG. 6, the layers formed above the signal detection electrode 60 in the right half portion of the MR head 1000 and the right half portion of the recording head 2000 are not shown.

In FIG. 6, Numeral 110 designates a conductor coil, and numeral 130 upper and lower magnetic core members, between which an insulating layer designated by 120 is formed for securing electrical insulation.

In the dual head 3000 according to the present invention, no reading operation is performed at the recording head 2000. Therefore, the magnetic core members 130 do not require any high magnetic permeability and low magnetostriction characteristics which are required at the time of reading, but only a high Bs characteristic at the time of writing. As a result, the upper and lower magnetic core members 130 can be constructed of a high Bs material as described above. Further, in view of the fact that the write characteristic is not substantially dependent on the magnetostriction constant of the magnetic core member 130, the margin of material selection and composition is widened, thereby facilitating production of the recording head 2000. This leads to an improvement in throughput and yield. Furthermore, an element such as Cr can be added for improving corrosion resistance, thus making available a recording head 2000 resistant to corrosion.

Figure 1:
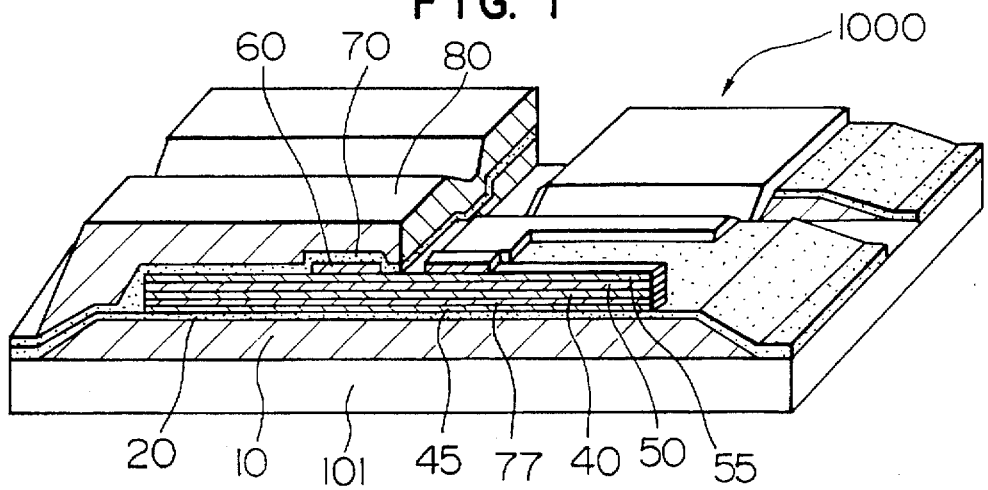
FIG. 1 is a perspective view of an MR head according to an embodiment of the present invention.

An embodiment of the MR head mounted on a magnetic disc apparatus according to the present invention is shown in FIG. 1, which is an enlarged perspective view as taken from the opposed surface of the medium. In FIG. 1, the upper gap film 70 and the upper shield film 80 in the right half portion of the MR head are not shown.

The MR head 1000 shown in FIG. 1 includes a lower shield film 10 formed above a non-magnetic ceramics substrate 101, a lower gap film 20 formed above the lower shield film 10, an antiferromagnetic film formed in the region between at least a pair of signal detection electrodes 60 above the lower gap film 20 and providing a first magnetic film 45, a second magnetic film 77 formed above the antiferromagnetic film and having a spontaneous magnetization, a magneto-resistance effect film 40 formed above the second magnetic film 77, a shunted film 50 and a soft film 55 arranged above the magneto-resistance effect film 40 for improving the magnetic response characteristic of the magneto-resistance effect film 40, an upper gap film 70 formed above the soft film 55, and an upper magnetic shield film 80 formed above the upper gap film 70.

Now, these films and the operation and materials of the layers will be explained.

The track width of the MR head 1000 is the distance between the two signal detection electrodes 60 and in the range of 1 to 10 μm. This region of the magneto-resistance effect film 40 is called a magneto-sensitive section where a magnetic signal from the magnetic disc is read.

The upper shield film 80 and the lower shield film 10 prevent a magnetic field other than a signal magnetic field from having an effect on the magneto-resistance effect film 40 to improve the signal resolution of the MR head 1000. The material used is a soft magnetic material such as an amorphous alloy of Co group, a NiFe alloy or an NiCo alloy having a thickness of about 0.5 to 3 μm.

The upper gap film 70 and the lower gap film 20 arranged adjacent to the magnetic shield films 80, 10 function to isolate the magneto-resistance effect element both electrically and magnetically from the upper and lower shield films 80, 10 and are composed of a non-magnetic insulating material such as glass or alumina. The thickness of the upper and lower gap films 70, 20 which has an effect on the reproduction resolution of the MR head 1000, and is dependent on the desired recording density of a magnetic disc apparatus. It is therefore generally in the range of 0.4 to 0.1 μm.

The magneto-resistance effect element formed between the upper and lower gap films 70, 20 includes a magneto-resistance effect film 40 having an electrical resistance changing with the magnetic field, a shunted film 50 and a soft film 55 formed to apply laterally biasing magnetic field to the magneto-resistance effect film 40 for converting a magnetic signal from the magnetic disc into a high-output electrical signal, a signal detection electrode 60 for supplying a signal detection current to the magneto-resistance effect film 40, a first magnetic film 45 for applying a longitudinally biasing magnetic field sufficient to form a single magnetic domain of at least the magnetosensitive portion of the magneto-resistance effect film 40, and a second magnetic film 77 arranged intermediate the first magnetic film 45 and the magneto-resistance effect film 40 for regulating the magnitude of the excessively strong longitudinally biasing magnetic field applied from the first magnetic film 45 into a high-output electrical signal. The first magnetic film 45 and the second magnetic film 77 making up a magnetic domain control layer 100 doubling as a reproduction output regulation layer will be explained in detail later.

The magneto-resistance effect film 40 is formed of a ferromagnetic thin film having an electrical resistance changing with the direction of magnetization such as an NiFe alloy, an NiCo alloy or an NiFeCo alloy. The thickness of this film is about 0.01 to 0.045 μm.

The signal detection electrode 60 is generally made of a thin film such as of Cu, Au, Nb or Ta having a small electrical resistance to allow a sufficient current of, say, $1\times10^6$ to $2\times10^7$ A/cm$^2$ to be supplied to the magneto-resistance effect film 40.

The shunted film 50 has the function to apply a laterally biasing magnetic filed at a sufficient level to make a highly sensitive magneto-resistance effect film 40. The direction of biasing is perpendicular to the direction determined by the magnetic domain control layer. A method using a shunted film for applying a laterally biasing magnetic field is called a shunt bias method. In the shunt bias method, a thin metal film such as of Ti, Nb, Ta, Mo or W is formed on the magneto-resistance effect film 40. Thickness of such a film is normally 0.01 to 0.04 µm. Also, in view of the laterally biasing magnetic field changing with the current flowing in the shunted film, it is necessary to regulate the resistivity at the same time as the thickness of the shunted film 50. The value of this resistivity is approximately one to four times larger than that of the magneto-resistance effect film 40.

Methods other than the shunt bias method-for applying a laterally biasing magnetic field at a sufficient level to attain a high sensitivity of the magneto-resistance effect film 40 as suited to the MR head for high-density magnetic recording, include a self-bias method and a soft film bias method. Both methods consist in forming a layer for applying a laterally biasing magnetic field adjacently to a magneto-resistance effect element.

In the self-bias method which utilizes the magnetic field generated by the current flowing in a magneto-resistance effect element, the laterally biasing magnetic field is reinforced by a magnetic shield film formed adjacently, and therefore it is important to form the magneto-resistance effect film in proximity to the magnetic shield film.

According to the soft film bias method, on the other hand, a ferromagnetic film having a soft magnetic characteristic is formed adjacently to a magneto-resistance effect film through a non-magnetic film, and the magnetic field generated by the current flowing in the magneto-resistance effect film is applied efficiently to the magneto-resistance effect film. The soft film 55 is made of such a material as NiFeRu, NiFeTa, NiFeRh, CoZrCr or MnZn ferrite.

These methods may be used not only independently but also as a composite bias method effectively by forming a soft film 55 on a shunted film 50 (nonmagnetic film). The composite bias method is employed for the MR head 1000 according to the present invention.

Now, explanation will be made about a method of fabricating the MR head 1000. The film-forming method or the patterning method described below uses sputtering, etching or photolithography.

First, an NiFe alloy film providing a lower shield film 10 is formed in the thickness of 2 µm, after which an alumina layer 0.3 µm is formed providing a lower gap film 20. The lower shield film 10 and the lower gap film 20 are processed into a predetermined shape. The end of the lower shield film 10 is processed into a form at an angle to the substrate surface as shown in FIG. 1. This is for preventing the signal detection electrode 60 formed over the lower magnetic shield film 10 from being disconnected at the end of the lower shield film 10. As the next step, an NiO film providing a first magnetic film 45 of 0.1 µm is formed on the lower gap film 20 under a low Ar gas pressure of 0.4 to 2 mtorr after exhausting the sputtering chamber to 0.3 to $3\times10^{-6}$ torr by use of an NiO target. The substrate is kept at room temperature. As the next step, an NiFeNb film providing the second magnetic film 77 is formed to a thickness of 200 Å at a predetermined position on the first magnetic film 45 in another sputtering chamber by use of a NiFeNb alloy target with the substrate kept at room temperature. Next, an NiFe alloy film providing the magneto-resistance effect film 40 is formed to a thickness of 400 Å, followed by an Nb film providing the shunted film 50 to a thickness of 400 Å, and a CoZrNb film providing the soft film 55 to a thickness of 400 Å. After that, a double layer of gold and titanium providing the signal detection electrode 60 is formed to a thickness of 0.1 µm and processed appropriately, followed by forming an alumina layer providing the upper gap film 70 to a thickness of 0.3 µm. Further, an NiFe alloy film providing the upper magnetic shield film 80 is formed to a thickness of 2 µm and is covered with a protective film of alumina, thus completing the fabrication of the MR head 1000.

The MR head 1000 according to the present invention has a magnetic domain control layer 100 at the magnetosensitive portion of the magneto-resistance effect film 40, and is most significant in that a second magnetic film 77 having spontaneous magnetization is interposed between the first magnetic film 45 and the magneto-resistance effect film 40. In the case where the first magnetic film 45 is made of an antiferromagnetic film, the magneto-resistance effect film 40, the second magnetic film 77 and the first magnetic film 45 are required to have progressively smaller magnitudes of spontaneous magnetization in that order. The first magnetic film 45 converts the magneto-resistance effect film 40 into a single magnetic domain by applying thereto a longitudinally biasing magnetic field through the second magnetic film 77, the second magnetic film 77, on the other hand, weakens the coupling magnetic field (longitudinally biasing magnetic field) which may become excessively large when the first magnetic film 45 is in direct contact with the magneto-resistance effect film 40 and facilitates the rotation by magnetization of magnetic moment in the magneto-resistance effect film 40 thereby to produce a high-output MR head. As a result, the magnetic domain control layer 100 according to the present invention may double as a reproduction output regulation layer, and by forming a magnetic head having such functions, the Barkhausen noise is prevented while at the same time improving the reproduction output. Further, a magnetic disc apparatus is realized in which a magnetic signal from a magnetic disc is capable of being converted into a high-output, noiseless electrical signal.

The structure and functions of the magnetic domain control layer 100 will be described.

Figure 7:
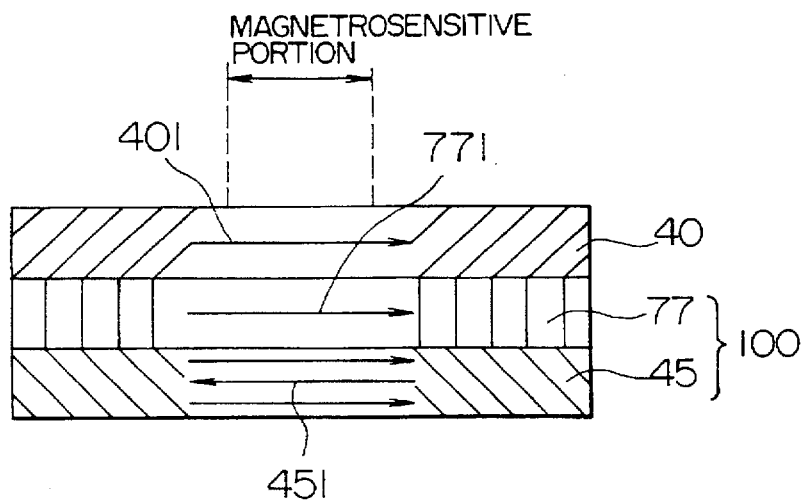
FIG. 7 is an enlarged sectional view showing the function of a magnetic domain control layer according to the present invention.

FIG. 7 is a sectional view showing in enlarged form the magneto-resistance effect film 40 as viewed from the medium-opposed surface, the first magnetic film making up the magnetic domain control layer 100, and the second magnetic film 77 holding spontaneous magnetization. In the case under consideration, the first magnetic film 45 is an antiferromagnetic film. In order to describe in detail the process of applying a longitudinally biasing magnetic field to the magneto-resistance effect film 40 to prevent the noise mentioned above, the directions of magnetic moment of the films are shown. Numerals 401, 771 and 451 designate the directions of magnetic moment as a model of the magneto-resistance effect film 40, the second magnetic film 77 and the first magnetic film 45, respectively.

The magnetic moment 451 in the first magnetic film 45 forms a magnetic exchange coupling of antiferromagnetism and ferromagnetism with the magnetic moment of the second magnetic film 77, which may be directed in the direction of magnetic moment designated by numeral 771. As a result, a longitudinally biasing magnetic field can be applied to the second magnetic film 77. When the magneto-resistance effect film 40 is formed on the second magnetic film 77 as the next step, the second magnetic film 77 and the magneto-resistance effect film 40 form a magnetic exchange coupling of ferromagnetism and ferromagnetism, so that the magnetic moment in the magneto-resistance effect film 40 can be directed in the direction designated by numeral 401. As a result, a longitudinally biasing magnetic field can be applied to the magneto-resistance effect film 40, thereby suppressing the Barkhausen noise.

In spite of the Barkhausen noise being suppressed, a high-density magnetic disc apparatus cannot be realized if the reproduction output of the magnetic head remains small. With the increase in density, the magnetic signal from the magnetic disc is decreased, thereby making it necessary to increase the output of the magnetic head. A method of increasing the reproduction output while suppressing the Barkhausen noise according to the present invention will be explained below.

If the Barkhausen noise is to be prevented, the longitudinally biasing magnetic field applied to the magneto-resistance effect film 40 is required to be increased. An excessively large longitudinally biasing magnetic field, however, undesirably reduces the reproduction output. This is because in such a case the magnetic moment in the magneto-resistance effect film 40 is prevented from being rotated sharply in accordance with the signal magnetic field from the magnetic disc. In order to realize a magnetic disc apparatus capable of producing a high-output, noiseless electrical signal, therefore, it is necessary to mount a magnetic head with the longitudinally biasing magnetic field (applied to the magneto-resistance effect film 40) reduced to the extent that the Barkhausen noise is preventable and having a longitudinally biasing magnetic field regulated to a desired value in accordance with the desired surface recording density of a magnetic disc apparatus.

According to the present invention, an excessively large longitudinally biasing magnetic field which may be generated when the magneto-resistance effect film 40 is in direct contact with the first magnetic film 45 is easily regulated to an optimum value by interposing the second magnetic film 77 smaller in spontaneous magnetization than the magneto-resistance effect film 40 between the magneto-resistance effect film 40 and the first magnetic film 45 and by adjusting the saturation magnetic flux density Bs.

The second magnetic film 77 holding spontaneous magnetization according to the present invention has an effect of shunt bias like the shunt film 50 described above. In the case where the second magnetic film 77 is formed on the side of the shunted film 50 opposite thereto through the magneto-resistance effect film 40 as shown in FIG. 1, however, the magneto-resistance effect film 40 is impressed with a laterally biasing magnetic film in the direction opposite to the bias applied by the shunt film 50. In this case, the magneto-resistance effect film 40 cannot have a high sensitivity. In order to obviate this problem, according to the present invention, the second magnetic film 77 is set to a resistivity of at least 100 μΩcm and made thinner than the magneto-resistance effect film 40. The second magnetic film 77 is thus reduced in conductivity thereby to prevent generation of a reverse lateral bias magnetic field.

Now, explanation will be made further about the above-mentioned embodiment made noiseless and high in output by use of an actual material. An apparatus using an NiFe alloy film, $(Ni_{81}Fe_{19})_{100-x}Nb_x$ film and an NiO film respectively for the magneto-resistance effect film 40, the second magnetic film 77 and the first magnetic film 45 will be dealt with.

Figure 8:
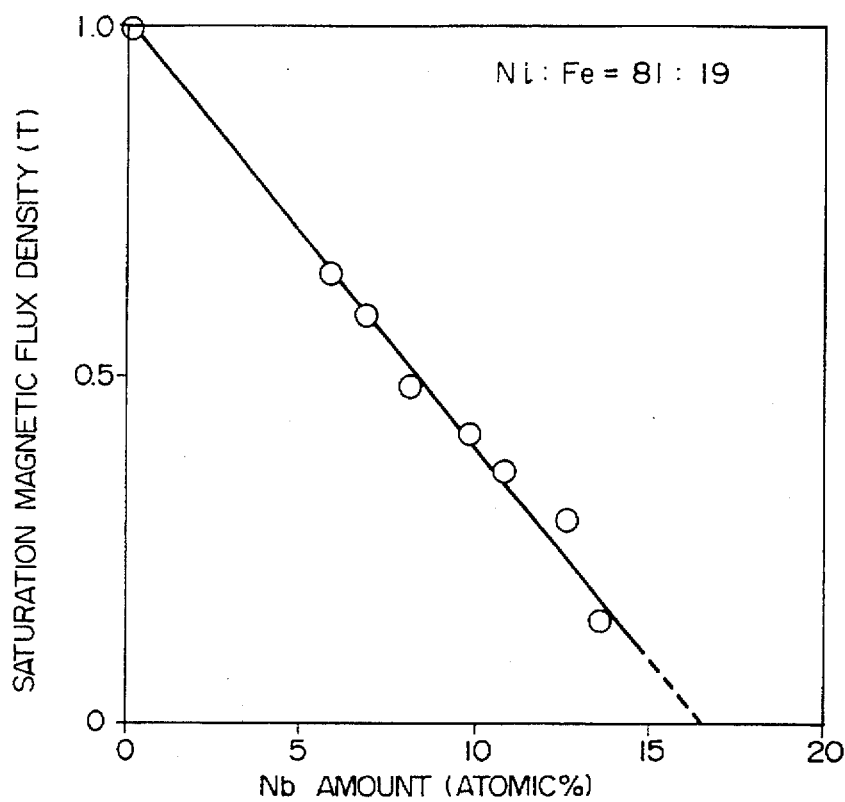
FIG. 8 is a diagram showing the Nb amount dependency of the saturation magnetic flux density of an NiFeNb alloy film.

FIG. 8 shows the Nb amount dependency of the saturation magnetic flux density of the $(Ni_{81}Fe_{19})_{100-x}Nb_x$ film providing the second magnetic film 77. We have discovered that the saturation magnetic flux density Bs can be reduced with the increase in Nb amount.

Figure 9:
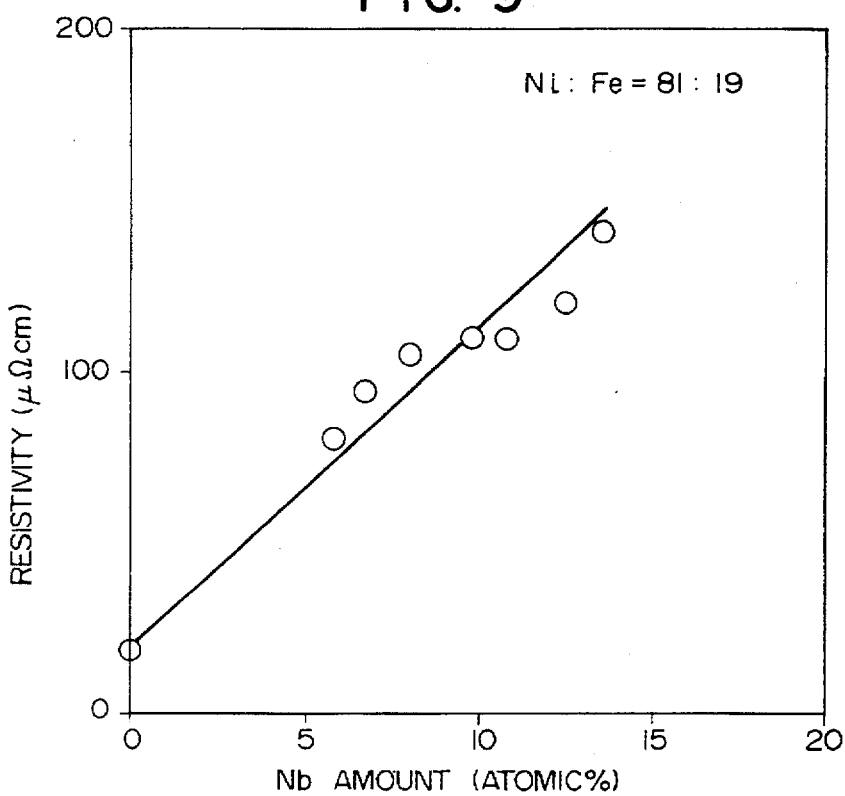
FIG. 9 is a diagram showing the Nb amount dependency of the specific resistance of an NiFeNb alloy film.

FIG. 9 shows the Nb amount dependency of the resistivity of $(Ni_{81}Fe_{19})_{100-x}Nb_x$ providing the second magnetic film 77. With the increase in Nb amount, resistivity can be increased, and a resistivity of 100 μΩcm or more could be attained for about 8 atomic % or more.

Figure 10:
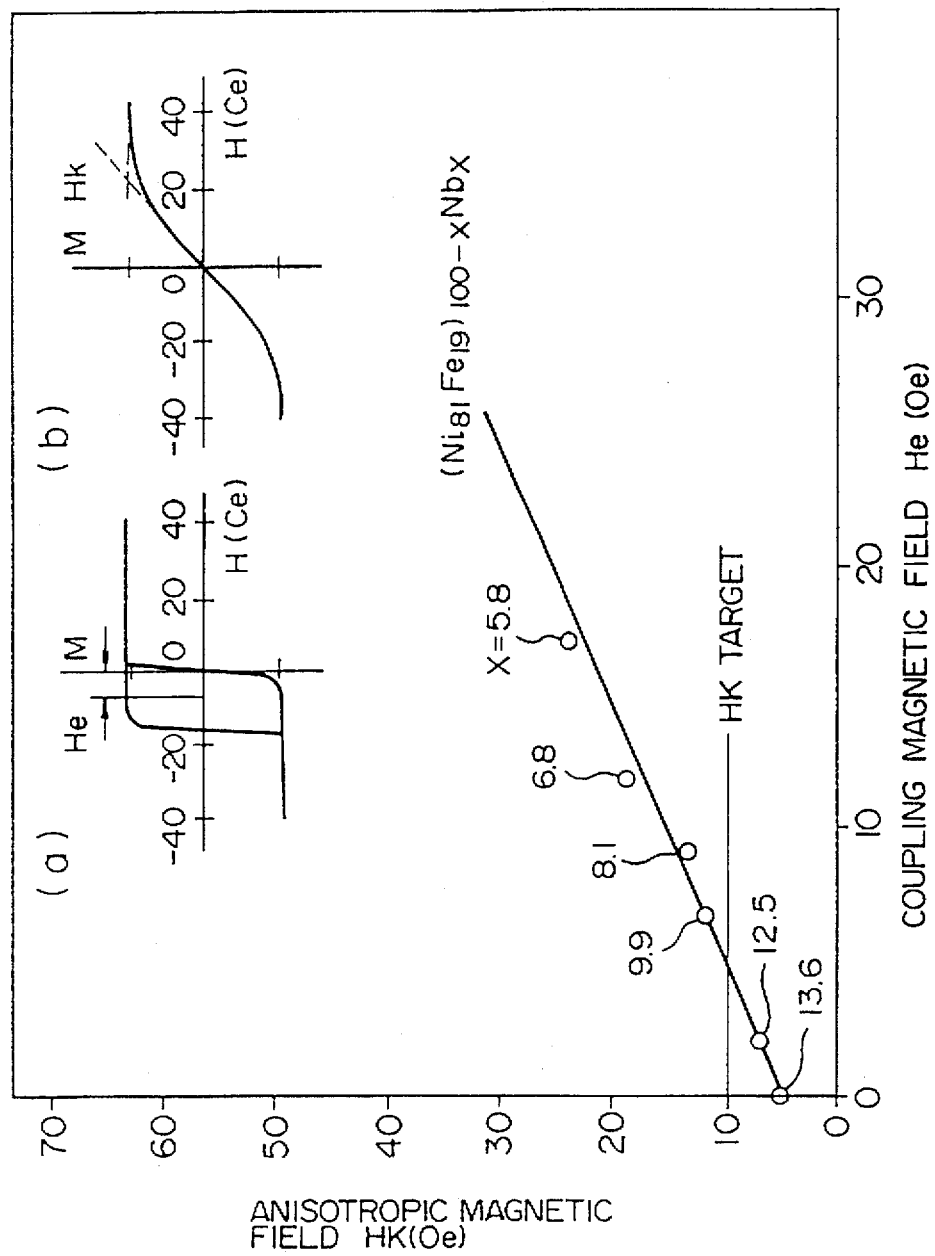
FIG. 10 is a diagram showing the relationship between an anisotropic magnetic field, a coupling magnetic field and the amount of Nb addition of an NiFeNb alloy film.

As the next step, the $(Ni_{81}Fe_{19})_{100-x}Nb_x$ with the spontaneous magnetization reduced below that of the magneto-resistance effect film 40 was interposed between an NiFe alloy film and an NiO film. FIG. 10 shows the relation between the coupling magnetic field He of this triple-layer film and an anisotropic magnetic field Hk. The coupling magnetic field He is observed as a shift amount from the origin in a magnetization curve of easy axis drive in (a) of FIG. 10. The anisotropic magnetic field Hk has a magnitude necessary for saturating the magnetization in hard axis driven in (a) of FIG. 10. The coupling magnetic field He and the anisotropic magnetic field Hk has a proportional relation to each other. This is because with the increase in the coupling magnetic field He, the magnetic moment of the magneto-resistance effect film 40 becomes difficult to rotate by magnetization and therefore the anisotropic magnetic field Hk also increases. The magnitude of the anisotropic magnetic field Hk is inversely proportional to the reproduction output of the magnetic head. As a result, it is essential to reduce the anisotropic magnetic field Hk if the reproduction output is to be increased. According to the present invention, the value of the anisotropic magnetic field Hk is required to be reduced at least below 20 Oe by adjusting the coupling magnetic field He, if a magnetic disc apparatus having a surface recording density of 170 megabits or more per square inch is to be realized. For a further increased surface recording density, the anisotropic magnetic field Hk is desirably reduced below 10 Oe.

According to the present invention, as shown in FIG. 10, the anisotropic magnetic field Hk and the coupling magnetic field He can be reduced with the increase in the Nb amount of the $(Ni_{81}Fe_{19})_{100-x}Nb_x$ film providing the second magnetic film 77. By increasing the Nb amount to more than about 6 atomic %, the value Hk can be reduced below 20 Oe, and by increasing the former to more than about 10 atomic %, the latter can be decreased below 10 Oe. As a result, the reproduction output of the magnetic head can be improved to such an extent that the surface recording density of the magnetic disc apparatus can be increased to more than 170 megabits per square inch.

Figure 11:
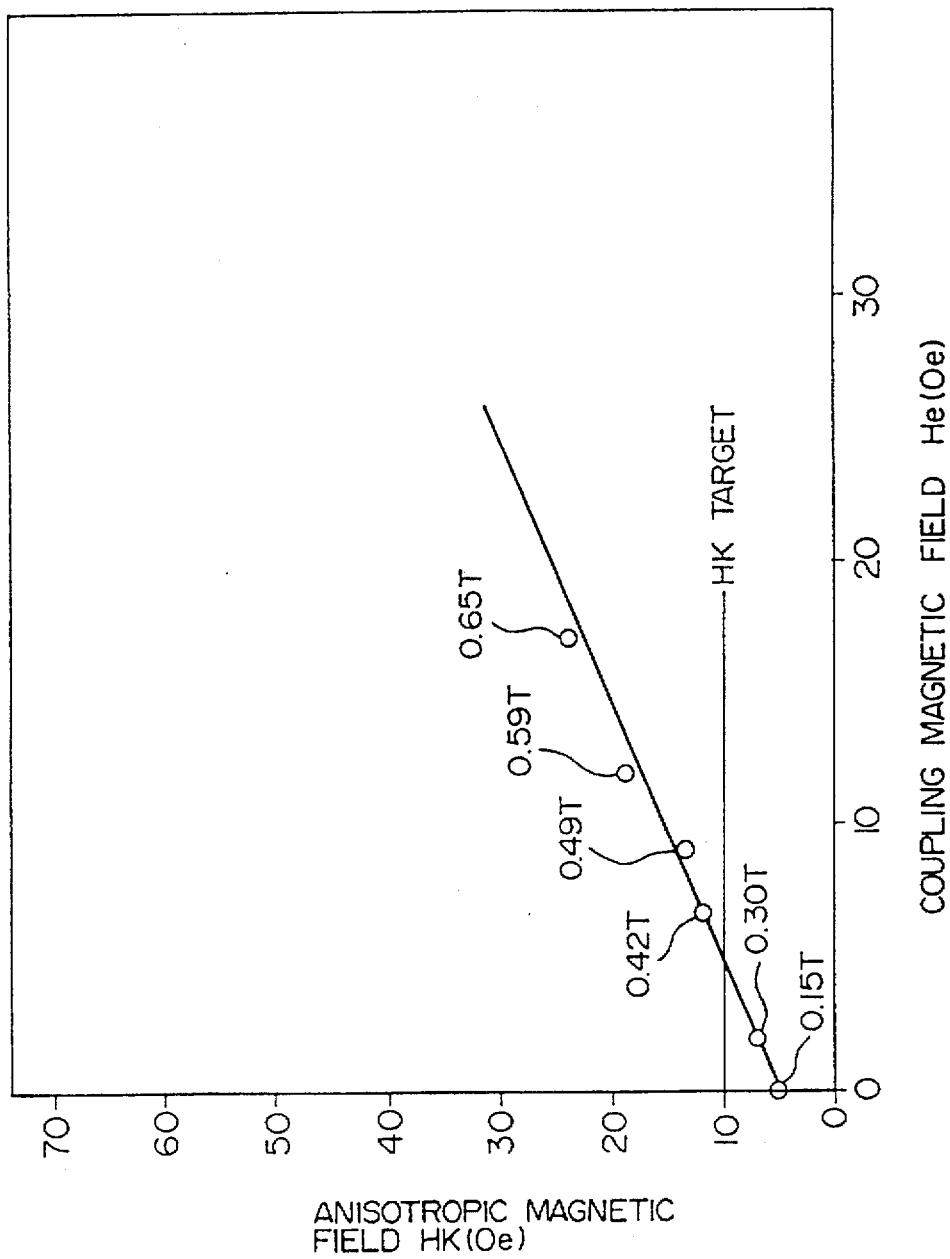
FIG. 11 is a diagram showing the relationship between an anisotropic magnetic field, a coupling magnetic field and the saturation magnetic flux density of an NiFeNb alloy film.

FIG. 11 is a diagram showing the relation between the anisotropic magnetic field Hk and the coupling magnetic field He and the saturation magnetic flux density Bs of the second magnetic film 77. According to the present invention, the anisotropic magnetic field Hk can be reduced below 20 Oe by reducing the saturation magnetic flux density Bs of the second magnetic film 77 to about 0.6 T or less, and below 10 Oe by reducing the latter to about 0.4 T or less. Thus the reproduction output of the magnetic head can be increased, with the result that the surface recording density of the magnetic disc apparatus is improved above 170 megabits per square inch.

Figure 12:
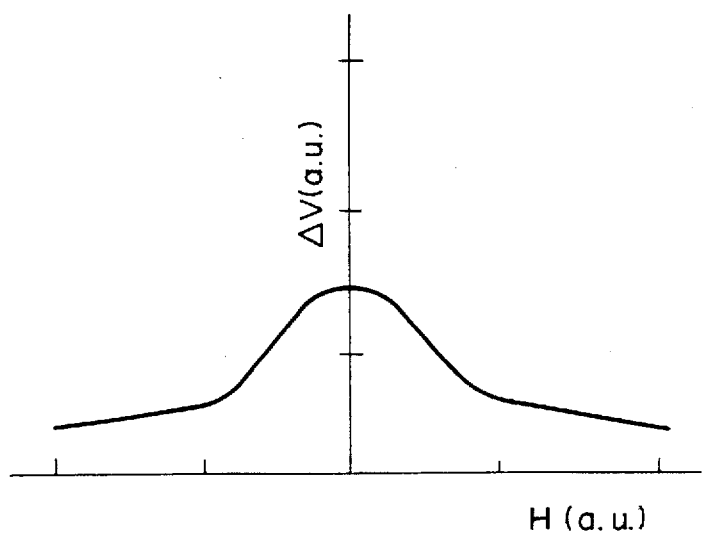
FIG. 12 is a diagram showing a curve of magneto-resistance change of a magneto-resistance effect element including a magnetic domain control layer according to the present invention.

FIG. 12 shows a magnetic reluctance curve of the magneto-resistance effect element including the magnetic domain control layer 100 with the anisotropic magnetic field Hk as 10 Oe. The ordinate represents the resistance change in ΔV, and the abscissa an applied magnetic field H. In FIG. 12, it has been made obvious that the Barkhausen noise can be suppressed by including the magnetic domain control layer. As a result, both the suppression of the Barkhausen noise and the improvement in the reproduction output could be achieved at the same time. Further, when Hk is reduced to 6 Oe, the Barkhausen noise still continues to be suppressed, thereby making it possible to improve the MR head sensitivity. The surface recording density of the magnetic disc apparatus thus could be increased to about 4000 megabits per square inch.

Figure 13:
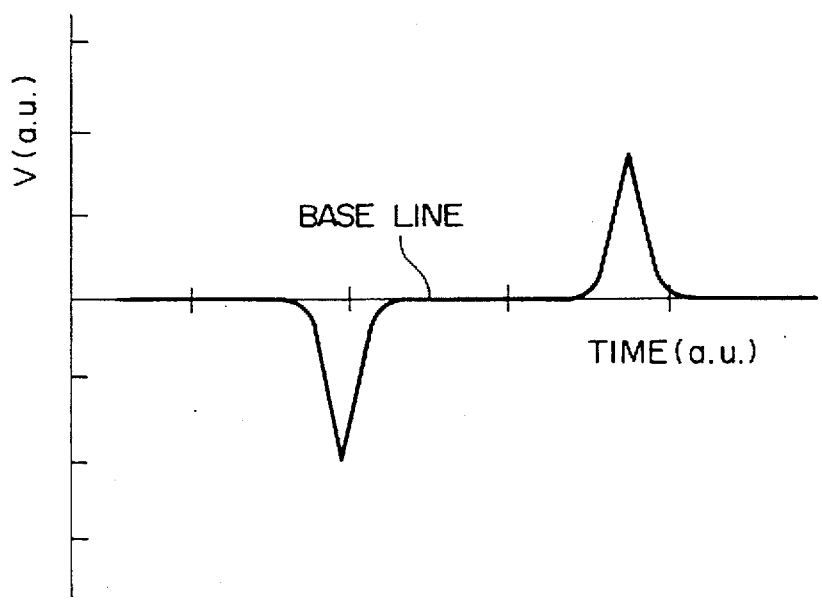
FIG. 13 is a diagram showing a reproduction waveform of an MR head including a magnetic domain control layer according to the present invention.

FIG. 13 shows an electrical signal produced from the magnetic disc with the MR head including the magnetic domain control layer 100 mounted on the magnetic disc apparatus according to the present invention. The abscissa represents time t, and the ordinate an output voltage V. No waveform distortion or waveform jump is observed. Also, the base line fluctuation can be suppressed to 2% or less for any disc speed (frequency), sense current or air bearing surface, thereby successfully suppressing the Barkhausen noise.

The inventors have also observed the magnetic domain of a magneto-resistance effect film formed adjacently to the magnetic domain control layer 100. In FIGS. 12 and 13, almost all specimens in which the Barkhausen noise was not generated had the magneto-resistance effect film 40 in single domain state. Also, no Barkhausen noise appeared to the extent that at least the magnetosensitive portion of the magneto-resistance effect film 40 is in, if not complete, single domain state. As a result, the present invention must include the fact that the Barkhausen noise can be suppressed when the magnetosensitive portion is at least in a single domain state.

Figure 14:
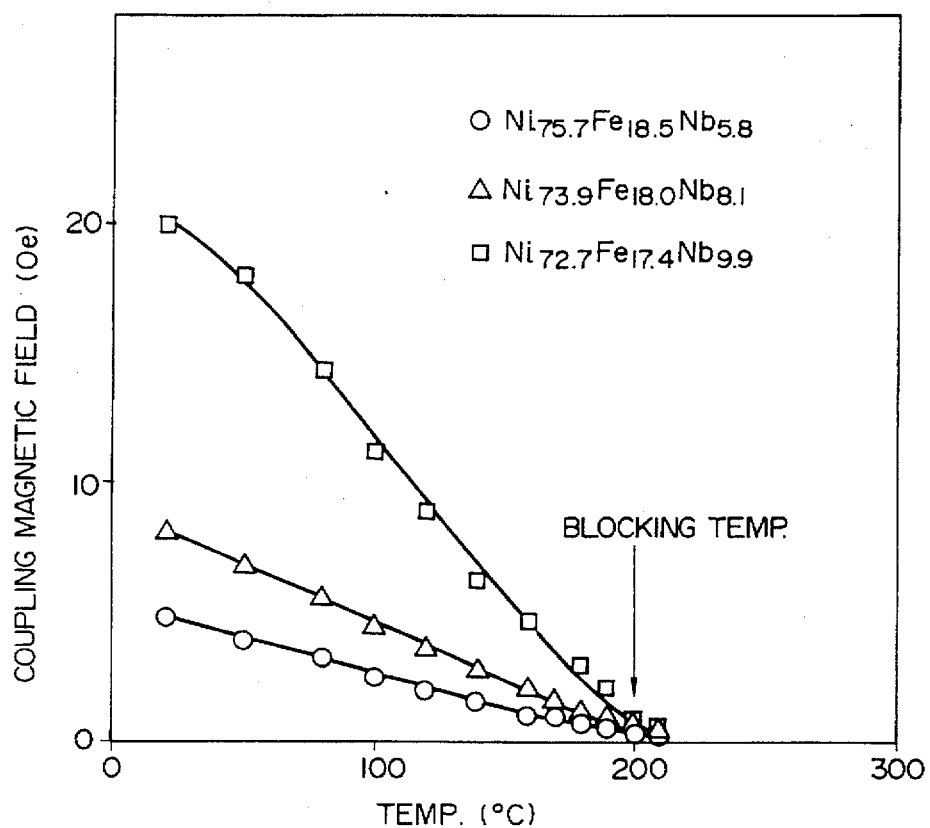
FIG. 14 is a diagram showing the blocking temperature of a magnetic domain control layer according to the present invention.

FIG. 14 shows the result of measuring the blocking temperature of the three-layer film in magnetic exchange coupling (NiFe alloy film, NiFeNb alloy film and NiO film) mounted on a magnetic disc apparatus according to the present invention. The blocking temperature remains constant at about 200° C. regardless of the interposition of the intermediate second magnetic film 77, even when the saturation magnetic flux density and Nb amount of the intermediate $(Ni_{81}Fe_{19})_{100-x}Nb_x$ film are changed. The blocking temperature thus can be increased to as high as about 200° C. Further, the high temperature of about 200° C. can be achieved even when the type of the second magnetic film 77 holding spontaneous magnetization is changed.

As described above, by changing the type, composition and saturation magnetic flux density of the second magnetic film 77 while holding the blocking temperature at as high a level as about 200° C., the values of the coupling magnetic field He and the anisotropic magnetic field Hk can be freely adjusted. These desired values thus could be easily obtained in accordance with the surface recording density of the magnetic disc apparatus. And a high reproduction output could be obtained. At the same time, in view of the fact that the Barkhausen noise, i.e., the base line fluctuation, could be suppressed, an electrical signal of high S/N could be produced while at the same time a high-density, reliable magnetic disc apparatus could be realized due to a high blocking temperature.

The optimum values of the anisotropic magnetic field Hk and the coupling magnetic field Re for suppressing the Barkhausen noise, i.e., the base line fluctuation and improving the reproduction output at the same time, varies with the type of the medium, the air bearing surface of the magnetic head, the type and thickness of the magneto-resistance effect film 40, the second magnetic film 77 and the first magnetic film 45, the shape and size of the magneto-resistance effect element or the contact area between the layers of the magneto-resistance effect film, the second magnetic film 77 and the first magnetic film 45. In such a case, the saturation magnetic flux density Bs of the second magnetic film 77 holding spontaneous magnetization should be adjusted by use of the above-mentioned technique of the present invention to a desired optimum value in accordance with the desired surface recording density of the magnetic disc apparatus.

The present invention must include a magnetization process of the magnetic domain control layer 100. In order to apply a uniform longitudinally biasing magnetic field to the magneto-resistance effect film 40, a process must be included for heating to at least the blocking temperature TB of an antiferromagnetic film providing the first magnetic film 45, and while applying a magnetic field in one direction, cooling below the blocking temperature. This magnetization process may be included either after the process of forming films or in any process of producing an MR head or a recording head. In the case where a thermal history of more than the blocking temperature is applied during the production processes, however, it is essential to include the process of passing the blocking temperature by cooling in a magnetic field in one direction.

If heat is applied up to higher than the blocking temperature at the time of or after forming the antiferromagnetic film providing the first magnetic film 45, the second magnetic film 77 or the magneto-resistance effect film 40, then the first magnetic film 45 becomes paramagnetic, so that the magnetic exchange coupling between the first magnetic film 45 and the second magnetic film 77 disappears. A subsequent continued cooling would result in a random arrangement of the magnetic moments in the first magnetic film 45, thereby making it impossible to apply a longitudinally biasing magnetic field to the magneto-resistance effect film 40 adjacent to the second magnetic film 77. When these layers are cooled to the blocking temperature TB while applying an external magnetic field in one direction, on the other hand, the first magnetic film 45 turns again from paramagnetic to antiferromagnetic state. In the process, the internal magnetic field of the second magnetic film 77 causes the magnetic moments in the first magnetic film 45 to align the magnetic moments in the second magnetic film 77 in one direction. Once the magnetic moments in the first magnetic film 45 are aligned, the very large magnetic anisotropy of the antiferromagnetic film fixes the particular direction securely, thereby making it possible to apply a unidirectional anisotropy, i.e., a longitudinally biasing magnetic field to the second magnetic film 77. The magneto-resistance effect film 40 in magnetic exchange coupling with the second magnetic film 77 can also be impressed with a longitudinally biasing magnetic field, thereby realizing a single magnetic domain.

Also, the present invention is required to include the fact that the Curie temperature Tc of the second magnetic film 77 is higher than the blocking temperature TB of the antiferromagnetic film providing the first magnetic film 45 as a magnetic characteristic of the magnetic layers making up the magnetic domain control layer 100. The Curie temperature is defined as a temperature at which the ferromagnetic state of a ferromagnetic material transfers to a paramagnetic state.

Figure 15:
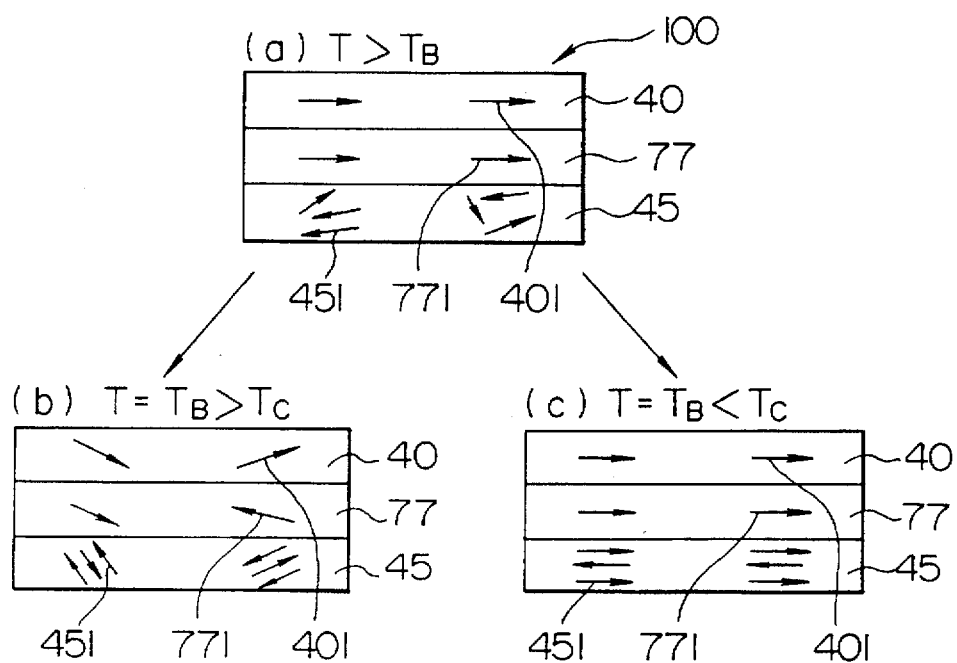
FIG. 15 is a diagram for explaining that the Curie temperature of a magnetic film holding a spontaneous magnetization is required to be higher than the blocking temperature according to the present invention.

FIG. 15 is a diagram for explaining the reasons for the above-mentioned phenomena with reference to the magnetic domain control layer 100 as a model.

First, the three thin films including the antiferromagnetic film providing the first magnetic film 45, the second magnetic film 77 and the magneto-resistance effect film 40 are heated to above the blocking temperature TB of the antiferromagnetic film. This heating is effected while applying a unidirectional external magnetic field. In FIG. 15(a) showing the state heated to higher than the blocking temperature TB, the antiferromagnetic film is in a paramagnetic state and therefore the magnetic moments remain random as shown by numeral 451. Also, since in the paramagnetic state, the magnetic exchange coupling with the second magnetic film 77 is lost. When the three films are cooled to below the blocking temperature TB of the antiferromagnetic film while applying a unidirectional magnetic field from the state of FIG. 15(a), the antiferromagnetic film tends to form a magnetic exchange coupling with the second magnetic film 77 arranged above. In the state of FIG. 15(b) where the Curie temperature Tc of the second magnetic film 77 is lower than the blocking temperature TB, the second magnetic film 77 is in paramagnetic state when the ambient temperature passes the blocking temperature. Therefore, a unidirectional magnetic exchange coupling cannot be formed and the direction of biasing magnetic fields becomes random, and so does the direction of the biasing magnetic field applied to the magneto-resistance effect film 40. As a result, it becomes impossible to apply a longitudinally biasing magnetic field to the magneto-resistance effect film 40, thereby making it impossible to suppress the Barkhausen noise. In the case of FIG. 15(c) where the Curie temperature Tc of the second magnetic film 77 is higher than the blocking temperature TB, on the other hand, the second magnetic film 77 is in ferromagnetic state when the ambient temperature is equal to the blocking temperature. In this case, upon application of a uni-directional external magnetic field, the magnetic moments 401, 771 of the magneto-resistance effect film 40 and the second magnetic film 77 are directed along the direction of an external magnetic field, and then the magnetic moments of the antiferromagnetic film are aligned as shown by numeral 451 by being led by the internal magnetic field of the second magnetic film 77. Once the magnetic moments are aligned as shown by numeral 451, the very large magnetic anisotropy of the antiferromagnetic film fixes the alignment securely. As a result, a magnetic exchange coupling can be formed with the magnetic moment of the second magnetic film 77 directed in the direction designated by numeral 771. A longitudinally biasing magnetic field can thus be applied also to the magneto-resistance effect film 40 adjacent to and in magnetic exchange coupling with the second magnetic film 77, thereby suppressing the Barkhausen noise. Only to the extent that the Curie temperature Tc is higher than the blocking temperature TB, therefore, a longitudinally biasing magnetic field can be applied to the magneto-resistance effect film 40 to suppress the Barkhausen noise.

Figure 16:
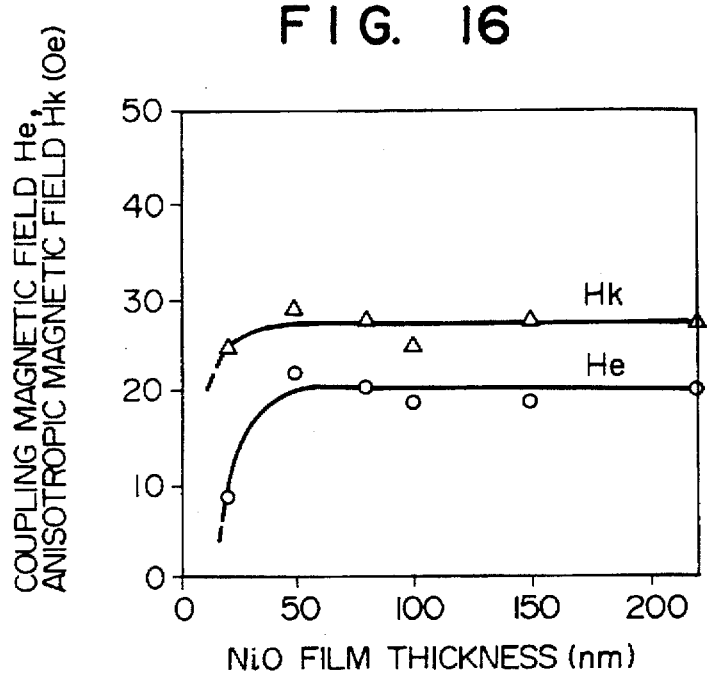
FIG. 16 is a diagram showing the NiO film thickness dependency of an anisotropic magnetic field and a coupling magnetic field of an NiO film according to the present invention.
Figure 17:
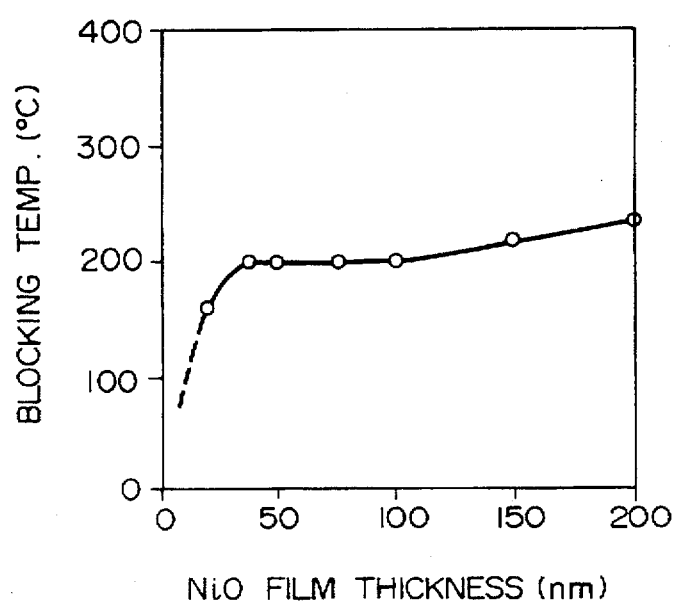
FIG. 17 is a diagram showing the NiO film thickness dependency of the blocking temperature of an NiO film according to the present invention.

FIG. 16 shows the result of studying the magnetic exchange coupling characteristic by forming an NiFe film on an NiO film in order to determine the optimum thickness of the NiO film providing the first magnetic film 45 laid on the MR head 1000. Character He designates a coupling magnetic field, i.e., a longitudinally biasing magnetic field. The coupling magnetic field increases with the NiO film thickness until it becomes constant at higher than 400 Å. FIG. 17 shows the result of studying the NiO film thickness dependency of the blocking temperature TB. The blocking temperature TB also settles at about 200° C. when the film thickness becomes higher than 400 Å, and somewhat increases for the film thickness of more than 1500 Å. It is therefore desirable to secure a satisfactory magnetic exchange coupling characteristic of the NiO film thickness and a film thickness of at least 400 Å where the characteristic remains stable. In the MR head 1000, on the other hand, the NiO film is arranged intermediate between the lower shield film 20 and the magneto-resistance effect film 40 as shown in FIG. 1. If the gap between them is increased, therefore, the resolution of the MR head would be deteriorated. The NiO film thickness therefore is desirably not more than 2000 Å. The present invention is required to include the fact that the optimum NiO film thickness is in the range of 400 to 2000 Å.

Now, explanation will be made about the materials of the second magnetic film 77 having spontaneous magnetization and the first magnetic film 45 making up a component element of the magnetic domain control layer 100 doubling as a reproduction output regulation layer according to the present invention.

The second magnetic film 77 according to the present invention is required to be in magnetic exchange coupling with both the magneto-resistance effect film 40 and the first magnetic film 45. For this purpose, the second magnetic film 77 must have spontaneous magnetization, and further, desirably does not exhibit a large magnetic reluctance change rate. Because the magnetic moments of the second magnetic film 77 and the magneto-resistance effect film 40 are not necessarily rotated at the same angle simultaneously in response to a signal magnetic field from the magnetic disc, but a noise may occur in a reproduced waveform. Further, a resistivity of at least 100 µΩcm is required in order to suppress generation of an inverse laterally biasing magnetic field to the magneto-resistance effect film 40 as described above. Also, a corrosion resistance and heat resistance as well as a high Curie temperature are necessary.

Materials satisfying the above-mentioned requirements at the same time include those shown below in addition to the above-mentioned NiFeNb alloy film.

Specifically, a ferromagnetic film made of a main component Fe, Co or Ni is recommended, to which 0 to 20% non-magnetic element is preferably added for securing a desired longitudinally biasing magnetic field and a proper Bs value. By adding a non-magnetic element, the saturation magnetic flux density Bs and the magneto-resistance effect of the second magnetic film 77 are reduced, and the resistivity of at least 100 µΩcm can be secured by alloy. Instead, two or more of the components Fe, Co and Ni may be used as main components to configure a ferromagnetic film with a 0 to 20% non-magnetic element added thereto. Also, a material either crystal or amorphous may be used as far as it has a spontaneous magnetization.

Any of the non-magnetic elements including Nb, Mo, Ta, W, Ti, V, Cr, Rh and Ru may be added. Further, two or more of these elements may be added. In such a case, the resistivity will be further increased thereby to further reduce the generation of a reverse laterally-biasing magnetic field to the magneto-resistance effect film 40.

In view of the fact that the optimum amount of the non-magnetic element to be added depends on the type, composition and thickness of the magneto-resistance effect film 40, the second magnetic film 77 and the first magnetic film 45, it is necessary to make adjustment from time to time to attain the desired coupling magnetic field by the technique according to the present invention.

The thickness of the second magnetic film 77 according to the present invention is 50 to 500 Å. If the reproduction output of the MR head is to be increased, the thickness should preferably be reduced to prevent generation of a reverse laterally biasing magnetic field and to reduce the conductivity of the magnetic film 77. A persistently uniform thickness cannot be obtained, however, if the film thickness is too small. When the thickness is increased, by contrast, the generation of a reverse laterally biasing magnetic field is so increased that the reproduction output is reduced. The desirable thickness of the second magnetic film 77, therefore, is in the range of 50 to 500 Å.

Further, when the film is constructed for the MR head 1000, the second magnetic film 77 is required to be smaller in thickness than the magneto-resistance effect film 40 to produce a high-output electrical signal.

Apart from NiO, the materials described below which exhibit a superior magnetic exchange coupling characteristic with the magneto-resistance effect film 40 may alternatively be used as a material for the first magnetic film 45 to achieve the above-mentioned object with equal effect.

More specifically, alternative materials usable with equal effect include an FeMn alloy, FeMnPd alloy, FeMnPt alloy, FeMnRh alloy, FeMnIr alloy, FeMnRu alloy, FeMnOs alloy, FeMnRe alloy, FeMnCr alloy, TbFe alloy, GdFe alloy, GdCo alloy or $\alpha$-$Fe_2O_3$.

The same object can be achieved also by adding a small amount of Fe or Co to NiO, or Co or Ni to $\alpha$-$Fe_2O_3$. This is also the case when a small amount of rare earth element La, Ce, Pr, Nd, Pm, Sm, Gd, Tb, Dy, Ho, Er, Tm or Yb is added to NiO or $\alpha$-$Fe_2O_3$.

According to the present invention, the effect mentioned below is attained by controlling the magnetic domain at the magnetosensitive portion of the magneto-resistance effect film 40.

In accordance with the surface recording density of the magnetic disc apparatus, a desired longitudinally biasing magnetic field can be easily and freely obtained by adjustment. Since the magnetosensitive portion is subjected to magnetic domain control, it is easy for the MR head to have a desired magnetic exchange coupling characteristic without sacrificing a superior reproducibility.

Furthermore, in a dual magnetic head according to the present invention, as shown in FIGS. 1 and 6, for instance, a signal detection electrode 60 is formed above a magneto-resistance effect film 40, above which an upper gap film 70, an upper shield film 80 and a recording head 2000 are layered. The inventors have confirmed that this configuration causes the magneto-resistance effect film 40 to be subjected to a complicated large stress. Generally, a magnetic anisotropy is generated when stress is exerted on a ferromagnetic material. This physical phenomenon is called the stress-induced anisotropy or inverse magnetostrictive effect, the magnitude of which is proportional to the magnitude of stress applied to the ferromagnetic material, the magnetostriction constants and the saturation magnetic flux density of the ferromagnetic material. Also, the direction of anisotropy is determined by the direction of stress applied and the positive or negative state of the magnetostriction constants. According to the present invention, the magnetostriction constants of the magneto-resistance effect film 40 are kept small (about $10^{-7}$). Since a considerable stress is exerted in the vicinity of the signal detection electrode 60 of the magneto-resistance effect film 40, however, a stress-induced anisotropy sufficient to disturb the unidirectional anisotropy is generated when the magnetic domain control is insufficient even if the magneto-striction constants of the magneto-resistance effect film 40 are reduced.

Nevertheless, according to the present invention, in which the magnetosensitive portion of the magneto-resistance effect film 40 has the magnetic domain directly controlled by the magnetic domain control layer 100, the unidirectional anisotropy is dominant over the stress-induced anisotropy, thereby making it possible to maintain a single magnetic domain with high stability. Further, the direct magnetic domain control of the magnetosensitive position leads to a single magnetic domain state with a small longitudinally biasing magnetic field. Specifically, the Barkhausen noise can be stably suppressed even with a small longitudinally biasing magnetic field. As a result, a high-output MR head is obtained advantageously, and at the same time a high-recording density of the magnetic disc apparatus is assured.

Further, according to the present invention, the magnetostriction constants of the second magnetic film 77 are reduced. This leads to the effect of maintaining a stable unidirectional anisotropy and stable suppression of the Barkhausen noise.

Another advantage of the present invention described below is obtained when the second magnetic film 77 mounted on the MR head 1000 is made of a ferromagnetic material composed of Ni as a main component. The magnetic domain control layer 100 is constructed by forming a second magnetic film 77 above the first magnetic film 45 and arranging a magneto-resistance effect film 40 further above. The magneto-resistance effect film 40 has an F.C.C. crystal structure. The ferromagnetic film of the main component Ni also has an F.C.C. crystal structure. In the case where the lower side of the magneto-resistance effect film 40 has an F.C.C. crystal structure, the magneto-resistance effect film 40 is obtainable by epitaxial growth. In such a case, the crystallinity of the magneto-resistance effect film 40 increases so much that the magnetic characteristic of the magneto-resistance effect film 40 is improved. This leads to an improved magnetic response characteristic of the MR head 1000.

Further, the use of an NiO film (about 200° C.) with a high blocking temperature according to the present invention, of all the antiferromagnetic films available for making up the first magnetic film 45, leads to the advantages mentioned below.

When the sense current is supplied to the MR head, the magnetic head is self-heated. If the self-heating increases the temperature of the magnetic head beyond the blocking temperature, the longitudinally biasing magnetic field for noise suppression would disappear. The present invention is therefore required to include the fact that the blocking temperature surpasses the temperature increase due to self-heating. The amount of self-heating depends on the density of the current supplied to the magneto-resistance effect element, and is larger, the higher the current density. Since the reproduction output of the MR head can be increased with the increase in the current density, on the other hand, it is desirable to supply a current of high density if a large reproduction output is to be produced. An extremely high current density, however, would cause an electromigration. The electromigration is defined as a phenomenon in which each atom making up a magneto-resistance effect element is driven out by a great amount of electrons and migrates to the positive electrode until finally the magneto-resistance effect element is disconnected. The present invention therefore is required to include the fact that the MR head is used with lower than an allowable current density where no electromigration occurs. According to the present invention, the maximum amount of heat generation is maintained at about 80° C. or less. The blocking temperature of the NiO film according to the present invention is about 200° C. and is higher than the maximum heating temperature of 80° C. Even if the magnetic head increases in temperature by self-heating, therefore, the longitudinally biasing magnetic field does not disappear, thereby providing a reliable magnetic disc apparatus.

Further, in FIG. 14, upon observation of the temperature dependency of a coupling magnetic field when $Ni_{72.7}Fe_{17.4}Nb_{9.9}$ with the anisotropic magnetic field Hk reduced to about 10 Oe is used as a second magnetic film 77, it is confirmed that the temperature change of the coupling magnetic field He is small in the temperature range of room temperature to 80° C. In other words, it is possible to maintain the anisotropic magnetic field Hk substantially at the same level. Since the anisotropic magnetic field Hk can be kept substantially constant in the operating temperature range of room temperature to 80° C. of the magnetic disc apparatus, always the same electrical signal and peak value can be obtained from the same information recorded in the magnetic disc, thereby securing a reliable reproducing operation. Further, the peak value fluctuation of the electrical signal with temperature is kept within 5%.

As described above, a noiseless, high-output magnetic disc apparatus is realized which is reliable in the range of operating temperature.

Furthermore, the corrosion resistance of the magnetic head is improved.

During the production processes of the magnetic head, the first magnetic film 45 is exposed to a corrosive environment, for example, during the process of polishing the medium-opposed surface. The actual polishing process is effected in a region of pH4 to pH8. The first magnetic film 45 is preferably constructed of a material high in corrosion resistance within this pH degree.

Figure 18:
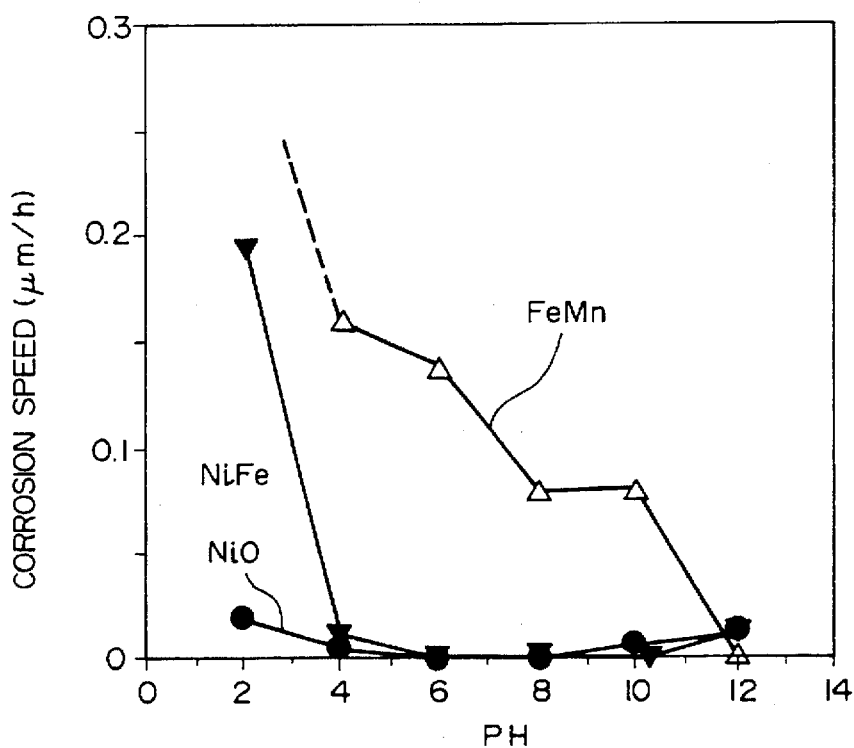
FIG. 18 is a diagram showing the result of a corrosion test of magnetic films.

FIG. 18 shows the result of a corrosion test of an NiO film and an FeMn film. For comparison, the result of an immersion test of an NiFe film providing an example of the magneto-resistance effect film 40 is shown. The acid side is adjusted in pH value by dripping hydrochloric acid on pure water, and the alkali side by dripping sodium hydroxide. After that, each aqueous solution is heated to 80° C., and the test piece is immersed therein for three hours. The unevenness of film thickness is measured before and after corrosion, and is divided by the immersion time to obtain a corrosion speed. In FIG. 18, it was confirmed that the NiO film is not corroded at all in the range of pH4 to pH8. The result of this test shows the use of an NiO film according to the present invention improves the corrosion resistance of the magnetic head.

As seen from above, the NiO film according to the present invention has a high corrosion resistance, and therefore a magnetic disc apparatus is produced at low production cost.

In the case where an FeMn alloy film is used for the first magnetic film 45, the internal environment of the magnetic disc apparatus is required to be kept at a low humidity because the antiferromagnetic film of FeMn group is liable to be oxidized. Also, a special measure and precaution must be taken to prevent corrosion and oxidization during the production processes. According to the present invention which includes the fact that the NiO film stands the humidity of 30 to 80%, the need of a device for maintaining the interior of the magnetic disc apparatus at low humidity is thus eliminated. The result is that the production cost and power consumption for operation of a magnetic disc apparatus are reduced, thus realizing a magnetic disc apparatus which is both low in production cost and reliable in operation. Further, the size of a small magnetic disc apparatus can be reduced even more.

In addition, the present invention has the advantage for production described below when an NiO film is used as the first magnetic film 45.

The NiO film according to the present invention is composed of an oxide. The present invention includes the fact that the magnetic exchange coupling with the second magnetic film 77 can be maintained even after the NiO film is exposed to the atmosphere, whereby the requirement of continuous layering in production processes is removed. As a result, no equipment addition is needed but the existing film-forming equipment may continue to be used advantageously.

Furthermore, the NiO film can be taken out into the atmosphere before forming a magnetic exchange coupling between the magneto-resistance effect film 40 and the second magnetic film 77 as mentioned above, and therefore the advantage results that the NiO film is processable into a shape different from the second magnetic film 77 or the magneto-resistance effect film 40. This permits various processes, and further the magnetic head is provided with additional functions by use of the NiO film. These advantages will be described as alternative methods later.

What is more, as described above, the NiO and other films can be formed in different sputtering chambers and different vacuum systems. This leads to the following advantage: If an oxide film and a metal film are formed in the same sputtering chamber and the same vacuum system, the exhaust speed is extremely decreased due to the oxide. In addition, the final vacuum degree is decreased. This would deteriorate the magnetic characteristics of the second magnetic film 77 and the magneto-resistance effect film 40. Also, the throughput would be adversely affected. Specifically, the MR characteristic of the magneto-resistance effect film 40 would be deteriorated, thereby causing an extremely unsatisfactory reproduction output of the MR head. The present invention, by contrast, includes the fact that the NiO film and other magnetic films are processed in different sputtering chambers and different vacuum systems, whereby impurities are shut out at the time of forming a magneto-resistance effect film 40, thereby making it possible to produce a high-output magneto-resistance effect film.

In the case where the first magnetic film 45 is configured of an antiferromagnetic film of an oxide, the second magnetic film 77 according to the present invention has an effect of also preventing oxygen diffusion from the antiferromagnetic film of oxide to the magneto-resistance effect film 40.

The NiO providing an antiferromagnetic oxide film, for example, is a non-stoichiometric compound. Normally, NiO is deficient of Ni and contains extraneous oxygen. In addition, NiO has not so great an affinity with oxygen as alumina. Therefore, oxygen is liable to make free access to NiO subjected to heat treatment. As a matter of fact, the heat treatment of a double layer of a magneto-resistance effect film 40 and an NiO film in magnetic exchange coupling resulted in the magnetic characteristic of the magneto-resistance effect film 40 being deteriorated. The inventors, after trying an Auger electron spectrocopy to check for the cause of deterioration, have discovered that the oxygen of the NiO film has diffused into the magneto-resistance effect film 40. In the case where the magneto-resistance effect film 40 contains such impurities as oxygen, the magnetic reluctance change rate of the magneto-resistance effect film decreases. The production of a magnetic head, on the other hand, includes a number of heat treatment processes. The highest temperature experienced in such heat treatments is about 250° C. As a result, in the case of a configuration with the magneto-resistance effect film 40 and the NiO film in direct contact with each other, the oxygen in the NiO film intrudes the magneto-resistance effect film 40. It is therefore necessary to take measures for keeping oxygen off from the magneto-resistance effect film.

The present invention includes the fact that oxygen is shut out by the second magnetic film 77.

Figure 19:
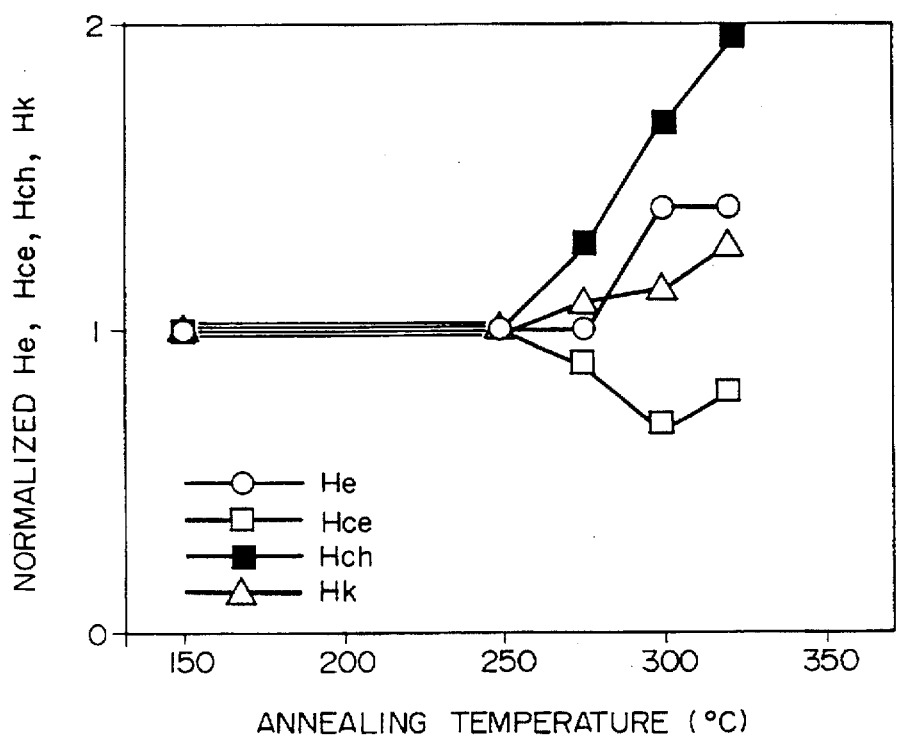
FIG. 19 is a diagram showing the result of a heat resistance test of magnetic domain control layers according to the present invention.

FIG. 19 shows the result of a heat resistance test conducted on a three-layer film in magnetic exchange coupling comprised of the magneto-resistance effect film 40, the NiO film and the second magnetic film 77 according to the present invention interposed therebetween. The heat treatment was conducted for three hours at each temperature in vacuum environment. In FIG. 19, the values after heat treatment were standardized with the magnetic property value before heat treatment as unity. As shown in FIG. 19, it has been found that after the heat treatment for three-hours at 250° C., the coupling magnetic field He, the easy-axis coercive force Hce, the hard-axis coercive force Hch and the anisotropic magnetic field Hk remain unchanged as compared before the heat treatment. This is also the case with the temperature of 275° C. This shows that the second magnetic film 77 according to the present invention is effective for efficient blocking of oxygen intruding the magneto-resistance effect film 40 from the NiO film. In the case where the first magnetic film 45 is composed of an antiferromagnetic oxide film, therefore, the second magnetic film 77 according to the present invention effectively prevents oxygen from being diffused from the antiferromagnetic oxide film to the magneto-resistance effect film 40, thereby preventing the reproduction output of the MR head from being deteriorated.

Further, the second magnetic film 77 contains oxygen intruded from the NiO film, so that the resistivity was substantially greater than that measured only with the second magnetic film 77. As a result, generation of the reverse laterally biasing magnetic field to the magneto-resistance effect film 40 can be reduced while improving the output of the magneto-resistance effect film 40. At the same time, the shunt ratio of current to the magneto-resistance effect film 40 is increased, thereby increasing the reproduction output of the MR head.

According to the present invention, the MR head 1000 has the second magnetic film 77 having spontaneous magnetization formed above the first magnetic film 45, above which the magneto-resistance effect film 40 is formed. The same object can be achieved, however, by a reverse layer structure, in which the second magnetic film 77 is formed above the magneto-resistance effect film 40, above which the first magnetic film 45 is formed to provide a magnetic domain control layer, and the resulting MR head structure is mounted on a magnetic disc apparatus.

Further, the object according to the present invention can be achieved by configuring the first magnetic film of a permanent magnet film such as of CoPt or CoPtCr alloy instead of the antiferromagnetic material mentioned above. In such an alternative case, the magnitude of spontaneous magnetization is greatest for the magneto-resistance effect film 40, followed by the first magnetic film 45 and the second magnetic film 77 in that order.

Furthermore, the first magnetic film 45 may alternatively be composed of a plurality of layers into which an antiferromagnetic material is deposited.

In addition, according to the present invention, in the magnet domain control layer 100, the magnitude of the longitudinally biasing magnetic field to be applied to the magneto-resistance effect film 40 can be regulated also by changing the thickness of the second magnetic film 77. The longitudinally biasing magnetic field to the magneto-resistance effect film 40 can be reduced to a desired value also by increasing the thickness of the magneto-resistance effect film 40 or the second magnetic film 77, thereby increasing the reproduction output in the range where the Barkhausen noise is possible to suppress. Further, the same object can be achieved by changing the thickness and the saturation magnetic flux density of the magneto-resistance effect film 40 and the second magnetic film 77 at the same time.

In addition, according to the present invention, the coupling magnetic field He has an NiO thickness dependency as shown in FIG. 16, and therefore the desired longitudinally biasing magnetic field can be obtained by changing the NiO film thickness.

Also, the second magnetic film 77 may be a magnetic film holding two or more layers of spontaneous magnetization.

Furthermore, the MR head 1000 according to the present invention may have the signal detection electrode 60 arranged below instead of above the magneto-resistance effect film 40.

What is more, in the above-mentioned embodiment, the second magnetic film 77 is formed adjacent at least to the magnetosensitive portion of the magneto-resistance effect film 40, and the first magnetic film 45 adjacent to the second magnetic film 77. Unlike such a configuration, the same object is considered achievable when the second magnetic film 77 and the first magnetic film 45 are arranged to double as an electrode at an electrode section where the magneto-resistance effect film 40 is subjected to a complicated stress to constitute an MR head assembly. In such a case, the signal detection electrode adjacent to the magneto-resistance effect film 40 is required to be configured of the second magnetic film 77 in the first place, followed by the first magnetic film 45 adjacently thereto.

As an alternative, in the above-mentioned production processes of the MR head, the NiO film providing the first magnetic film 45 may be patterned at the magnetosensitive portion of the magneto-resistance effect film 40 before forming the second magnetic film 77, the magneto-resistance effect film 40, the shunted film 50 and the soft 55 in position.

Furthermore, the second magnetic film 77, the magneto-resistance effect film 40, the shunted film 50 and the soft film 55, after being layered sequentially, may be patterned in position by the ion milling method collectively, followed by leaving only the NiO film providing the first magnetic film 45 as an as-depo one over the whole surface.

Furthermore, the NiO film providing the first magnetic film 45 may be formed above the lower shield film 20 and these films may be collectively processed into the same shape as the lower shield film 20 shown in FIG. 1, before forming and collectively patterning the second magnetic film 77, the magneto-resistance effect film 40, the shunted film 50 and the soft film 55.

In addition, in the case where the first magnetic film 45 is composed of an antiferromagnetic oxide material, a small amount of Fe, Co or Ni chip or a rare earth element La, Ce, Pr, Nd, Pm, Sm, Gd, Tb, dy, Ho, Er, Tm or Yb or an oxide chip thereof may be arranged on the antiferromagnetic oxide target (NiO, iron oxide) for sputtering to produce the first magnetic film 45 achieving the same object.

Furthermore, an antiferromagnetic oxide target (NiO, iron oxide) containing one of the above-mentioned elements may be used to produce the first magnetic film 45 for the purpose of sputtering.

What is more, although the NiO providing the first magnetic film 45 according to the present invention is formed at room temperature, the NiO and the NiO containing a third element mentioned above may be formed in the range of room temperature to 250° C. Also, Ar+O$_2$ in place of Ar may be used as a discharge gas seed with equal effect.

In addition, a small amount of Fe, Co or Ni, a chip composed of any of the above-mentioned rare earth elements, or an oxide chip thereof may be arranged on Ni or a target composed of Ni, and Ar+O$_2$ used as a discharge gas seed for the purpose of reactive sputtering to form the first magnetic film 45.

Furthermore, a small amount of hydrogen or helium gas may be mixed with the above-mentioned discharge gas seed, whereby the antiferromagnetic oxide film can be solidified, with the result that a quality antiferromagnetic oxide film is considered possible to produce.

When an antiferromagnetic oxide film is formed while applying a bias voltage to the substrate, a solid film is capable of being produced, thereby making it possible to produce a quality antiferromagnetic oxide film.

The second magnetic film 77 according to the present invention may be fabricated by sputtering with any of the above-mentioned chips of non-magnetic metal using a target such as Fe, Co, Ni, Fe—Co, Co—Ni or Ni—Fe alloy in appropriate amount. An alloy target containing an appropriate amount of any of the above-mentioned non-magnetic metals may alternatively be used.

Further, the second magnetic film 77 may contain at least one of Fe, Co and Ni as a main component and may be constructed of an alloy film of at least one of the elements Sc, Mn, Zn, Y, Zr, Tc, Pd, Ag, Hf, Re, Os, Ir, Pt, Au and lanthanoid. It is thus considered possible to form the second magnetic film 77 meeting the object of the invention.

In addition, although Ar is used as a discharge gas seed for forming the second magnetic-film 77 according to the present invention in the aforementioned embodiment, Ar+N$_2$ may alternatively be used for sputtering to meet the same object.

Any temperature between room temperature and 250° C. may be used for sputtering to form the second magnetic film 77 meeting the object.

Further, the first magnetic film 45 and the second magnetic film 77 according to the present invention are capable of being formed by use of the ion beam sputtering, vacuum deposition, plating or other appropriate film-forming methods.

In addition, the advantage mentioned below is obtained by arranging a permanent magnet film like CoPt or CoPtCr alloy partially in contact with an antiferromagnetic film providing the first magnetic film 45, the second magnetic film 77 or the magneto-resistance effect film 40 in the MR head 1000 according to the present invention.

Should the MR head be subjected to a thermal history of the blocking temperature or higher of the antiferromagnetic film, the longitudinally biasing magnetic field applied to the magneto-resistance effect film 40 disappears. When the assembly is cooled to the blocking temperature or lower, the magneto-resistance effect film 40, the second magnetic film 77 or the antiferromagnetic film in contact with a permanent magnet film is capable of being in magnetic exchange coupling with the permanent magnet film. As a consequence, the longitudinally biasing magnetic field applied to the magneto-resistance effect film 40 can be maintained even under a thermal history of the blocking temperature or higher. Further, the CoPt alloy or the like generates a strong magnetic flux in a direction, and therefore can be used advantageously for forming a single magnetic domain of the magneto-resistance effect film 40. In addition, in the case of using the soft film bias or the composite bias method, the magnetic domain of the soft film can be controlled and therefore the magnetic domain of the magneto-resistance effect film 40 can be controlled stably.

Furthermore, since the antiferromagnetic oxide film such as an NiO film according to the present invention exhibits an insulation characteristic, the lower gap film 20 may be constituted as an NiO film in the MR head 1000. In this case, the production processes of the lower gap film 20 are eliminated to reduce the production cost. Further, since the MR 1000 has the magnetic moments in the magneto-resistance effect film 40 aligned in a direction at the end of production, the process of heat treatment in a magnetic field is included. The MR head 1000 is equipped with the upper and lower shield films 80, 10, the thickness and area of which are very large as compared with the magneto-resistance effect film 40. For this reason, a small applied magnetic field would be absorbed entirely into the magnetic shield films. A considerably strong magnetic field is therefore required for aligning the magnetic moments in the magneto-resistance effect film 40 at the time of heat treatment in the magnetic field. In the case where the NiO film functions as the lower gap film 20 at the same time, however, the magnetic field required to align the magnetic moments in the magneto-resistance effect film 40 is equivalent to a coupling magnetic field, i.e., several to several hundred oersted. This is because the NiO film is in magnetic exchange coupling with both the magneto-resistance effect film 40 and the lower shield film 10. It therefore follows that heat treatment with an external magnetic field of a magnitude equivalent to the coupling magnetic field makes it possible to align the directions of the magnetic moments in the magneto-resistance effect film 40. This leads to a considerably reduced power consumption for heat treatment in the magnetic field, thereby remarkably reducing the production cost of the MR head.

Further, the interposition of an antiferromagnetic oxide film according to the present invention below the upper gap film and above the soft film 55 and the signal detection electrode 60 in the MR head 1000 having the soft film 55 has the following advantage: The antiferromagnetic oxide film and the soft film are in magnetic exchange coupling with each other, and therefore the magnetic domain of the soft film 55 can be controlled. When the soft film is in multiple magnetic domain state, the magneto-resistance effect film 40 arranged in proximity to the soft film 55 is liable to develop a noise. By controlling the soft film 55 by the antiferromagnetic oxide film with a magnetic domain and maintaining a single magnetic domain state of the soft film 55, the noise developed in the magneto-resistance effect film 40 is suppressed stably. Further, the upper gap film 70 may be doubled by the antiferromagnetic oxide film according to the present invention. In addition, an antiferromagnetic oxide film may be formed through the second magnetic film 77.

Moreover, the magnetic domain control layer according to the present invention, which constitutes an MR head with a shield film, may alternatively be applicable with equal effect to a non-shield MR head, a yoke-type MR head, barber-pole MR head or a magnetic sensor solely utilizing the magneto-resistance effect of a ferromagnetic film.

The present invention is applicable not only to the application of a longitudinally biasing magnetic field but also to a laterally biasing magnetic field.

The present invention is also applicable to a conventional magnetic head of electromagnetic induction type as well as to the magnetic domain control of the magneto-resistance effect film 40. In the magnetic head of electro-magnetic induction type, the magnetic domain control of the magnetic films is considered possible by applying the magnetic domain control according to the present invention to the upper and lower magnetic cores.

Furthermore, the present invention is considered applicable to the application of a unidirectional anisotropy to a ferromagnetic film in a giant magneto-resistance effect film.

According to the present invention, there is provided a magnetic disc apparatus capable of high-output reproduction.

Further, according to the present invention, there is provided a magnetic disc apparatus capable of noiseless, high-output, stable reproduction within the operating temperature range.

It will thus be understood from the foregoing description that the present invention provides a magnetic disc apparatus comprising a magnetic disc 1.5 to 6.5 inches in diameter, means for rotating the magnetic disc at the speed of 3500 to 5000 rpm, and a magnetic head for converting the magnetic signal recorded in the magnetic disc into an electrical signal by a magneto-resistance effect film, wherein the track density of the magnetic disc is 2.6 to 20.0 tpi, the bit density 60 to 200 ktpi, the transfer speed 6 to 9 MB/s and the access time 5 to 10 ms for reproduction.

We claim:

1. A magnetic disc apparatus comprising a magnetic head including a magneto-resistance effect film comprising a ferromagnetic thin film having an electrical resistance changing with a direction of magnetization for converting a magnetic signal into an electrical signal by use of a magneto-resistance effect and a pair of electrodes for supplying a signal detection current to said magneto-resistance effect film;

said apparatus further comprising a magnetic domain control layer arranged in contact with said magneto-resistance effect film in a region between said pair of electrodes, said magnetic domain control layer including a first magnetic film for applying a substantially longitudinal biasing magnetic field to at least a magnetosensitive portion of said magneto-resistance effect film located between said pair of electrodes to form a single domain therein, and a second magnetic film formed between said first magnetic film and said magneto-resistance effect film so as to regulate a magnitude of magnetic coupling between said magneto-resistance effect film and said first magnetic film to a predetermined level which effects single domain formation for Barkhausen noise reduction while allowing magnetic moment rotation of said magneto-resistance effect film for signal detection sensitivity, wherein a thickness of said second magnetic film is smaller than that of said magneto-resistance effect film;

wherein said magneto-resistance effect film, said second magnetic film and said first magnetic film are formed to have progressively smaller magnitudes of spontaneous magnetization in the stated order, and wherein a first magnetic exchange coupling between said magneto-resistance effect film and said second magnetic film and a second magnetic exchange coupling between said second magnetic film and said first magnetic film are formed to control said single domain of said magneto-resistance effect film.

2. A magnetic disk apparatus according to claim 1, further comprising a magnetic disk rotated with a peripheral speed increasing progressively toward an outer periphery thereof, said magnetic head converting a magnetic signal recorded in said magnetic disk into an electric signal by use of a magneto-resistance effect, and means for suppressing the base line fluctuation of the electrical signal.

3. A magnetic disk apparatus according to claim 1, further comprising a magnetic disk 1.5 to 6.5 inches in diameter, rotary means for rotating said magnetic disk at a speed of 3500 to 5000 rpm, said magnetic head converting a magnetic signal recorded in said magnetic disk into an electrical signal by use of said magneto-resistance effect film, wherein information recorded in said magnetic disk with a track density of 2.6 to 20.0 ktpi and a bit density of 60 to 200 kbpi is reproduced with a transverse speed of 6 to 9 MB/s and an access time of 5 to 10 ms.

4. A magnetic disc apparatus comprising a magnetic head having a magneto-resistance effect film comprising a ferromagnetic thin film having an electrical resistance changing with a direction of magnetization for converting a magnetic signal into an electrical signal by use of a magneto-resistance effect and a pair of electrodes for supplying a signal detection current to said magneto-resistance effect film;

said apparatus further comprising a magnetic domain control layer arranged in contact with said magneto-resistance effect film in a region between said pair of electrodes, said magnetic domain control layer having an antiferromagnetic domain control layer for applying a substantially longitudinal biasing magnetic field to at least a magnetosensitive portion of said magneto-resistance effect film between said pair of electrodes to form a single domain thereon, and a magnetic film formed between said antiferromagnetic domain control layer and said magneto-resistance effect film so as to regulate a magnitude of magnetic coupling between said magneto-resistance effect film and said antiferromagnetic domain control layer to a predetermined level which effects single domain formation for Barkhausen noise reduction while allowing magnetic moment rotation of said magneto-resistance effect film for signal detection sensitivity;

wherein a spontaneous magnetization of said magnetic film is larger than that of said antiferromagnetic film, and a thickness of said antiferromagnetic domain control layer is larger than that of said magneto-resistance effect film;

wherein said magneto-resistance effect film, said magnetic film and said antiferromagnetic domain control layer are formed to have progressively smaller magnitudes of spontaneous magnetization in the stated order, and wherein a first magnetic exchange coupling between said magneto-resistance effect film and said magnetic film and a second magnetic exchange coupling between said magnetic film and said antiferromagnetic domain control layer are formed to control said single domain of said magneto-resistance effect film.

5. A magnetic disc apparatus comprising a magnetic head including a magneto-resistance effect film comprising a ferromagnetic thin film having an electrical resistance changing with a direction of magnetization for converting a magnetic signal into an electrical signal by use of a magneto-resistance effect and a pair of electrodes for supplying a signal detection current to said magneto-resistance effect film;

said apparatus further comprising a magnetic domain control layer arranged in contact with said magneto-resistance effect film in a region between said pair of electrodes, said magnetic domain control layer having a permanent magnet film for applying a substantially longitudinal biasing magnetic field to at least a magnetosensitive portion of said magneto-resistance effect film between said pair of electrodes to form a single domain therein, and a magnetic film formed between said permanent magnet film and said magneto-resistance effect film so as to regulate a magnitude of magnetic coupling between said magneto-resistance effect film and said permanent magnetic film to a predetermined level which effects single domain formation for Barkhausen noise reduction while allowing magnetic moment rotation of said magneto-resistance effect film for signal detection sensitivity;

wherein a spontaneous magnetization of said magneto-resistance effect film being larger than that of said permanent magnet film wherein a spontaneous magnetization of said permanent magnet film is smaller than that of said magnetic film, wherein a thickness of said magnetic film is smaller than that of said magneto-resistance effect film; and wherein said magneto-resistance effect film and said magnetic film are formed to have progressively smaller magnitudes of spontaneous magnetization in the stated order, and wherein a first magnetic exchange coupling between said magneto-resistance effect film and said magnetic film and a second magnetic exchange coupling between said magnetic film and said permanent magnetic film are formed to control said single domain of said magneto-resistance effect film.

6. A magnetic disc apparatus as claimed in claim 5, wherein said magnetic head immediately processes the signal read from a magnetic disc.

7. A magnetic disc apparatus as claimed in claim 5, wherein said magnetic head converts a magnetic signal recorded in a magnetic disc 1.5 to 3 inches in diameter into an electrical signal by use of the magneto-resistance effect.

8. A magnetic disk apparatus according to claim 5, wherein said magnetic head is a heat treated magnetic head wherein said magnetic head is subjected to heat treatment along an easy-axis direction of said magneto-resistance effect film while said magnetic head is maintained at not less than a blocking temperature of the anti-ferromagnetic film with said magnetic head then being cooled in a magnetic field along the same direction to less than said blocking temperature.

9. A magnetic head comprising a magneto-resistance effect film comprising a ferromagnetic thin film having an electrical resistance changing with a direction of magnetization for converting a magnetic signal into an electrical signal by use of a magneto-resistance effect and a pair of electrodes for supplying a signal detection current to said magneto-resistance effect film;

said magnetic head further comprising a magnetic domain control layer arranged in contact with said magneto-resistance effect film in a region between said pair of electrodes, said magnetic domain control layer having a first magnetic film for applying a substantially longitudinal biasing magnetic field to at least a magnetosensitive portion of said magneto-resistance effect film between said pair of electrodes to form a single domain therein, and a second magnetic film formed between said first magnetic film and said magneto-resistance effect film for regulating a magnitude of magnetic coupling between said magneto-resistance effect film and said first magnetic film to a predetermined level which effects single domain formation for Barkhausen noise reduction while allowing magnetic moment rotation of said magneto-resistance effect film for signal detection sensitivity;

wherein a thickness of said second magnetic film is smaller than that of said magneto-resistance effect film;

wherein said magneto-resistance effect film, said second magnetic film and said first magnetic film are formed to have progressively smaller magnitudes of spontaneous magnetization in the stated order, and wherein a first magnetic exchange coupling between said magneto-resistance effect film and said second magnetic film and a second magnetic exchange coupling between said second magnetic film and said first magnetic film are formed to control said single domain of said magneto-resistance effect film.

10. A magnetic head comprising:

a magneto-resistance effect film for converting a magnetic signal into an electrical signal by use of a magneto-resistance effect, said magneto-resistance effect film comprising a ferromagnetic film;

a pair of electrodes for supplying a signal detection current to said magneto-resistance effect film;

a first magnetic film for applying a substantially longitudinal biasing magnetic field to a magnetosensitive portion of said magneto-resistance effect film between said electrodes; and a second magnetic film formed between said first magnetic film and said magnetosensitive portion of said magneto-resistance effect film, said second magnetic film having a smaller magnitude in spontaneous magnetization than that of said magneto-resistance effect film and being arranged to regulate a magnitude of magnetic coupling between said magneto-resistance effect film and said first magnetic film to a predetermined level which effects single domain formation for Barkhausen noise reduction while allowing magnetic moment rotation of said magneto-resistance effect film for signal detection sensitivity, said first magnetic film being an antiferromagnetic domain control layer, a magnitude of a spontaneous magnetization of said magneto-resistance effect film being largest, that of said second magnetic film being next, and that of said first magnetic film being smallest.

11. A magnetic film as claimed in claim 10, wherein said first magnetic film comprises antiferromagnetic material.

12. A magnetic film as claimed in claim 10, wherein said first magnetic film comprise a permanent magnet.

13. A magnetic film as claimed in claim 10, wherein said magneto-resistance effect film comprises NiFe, said first magnetic film comprises NiO or CoPt and said second magnetic film comprises NiFeNb.

14. A magnetic film as claimed in claim 10, wherein said first magnetic film comprises NiO.

15. A magnetic disc apparatus comprising a magnetic head including a magneto-resistance effect film comprising a ferromagnetic thin film having an electrical resistance changing with a direction of magnetization for converting a magnetic signal into an electrical signal by use of a magneto-resistance effect film and a pair of electrodes for supplying a signal detection current to said magneto-resistance effect film;

said apparatus further comprising a magnetic domain control layer arranged in contact with said magneto-resistance effect film in a region between said pair of electrodes, said magnetic domain control layer including a first magnetic film for applying a substantially longitudinal biasing magnetic field to at least a magnetosensitive portion of said magneto-resistance effect film located between said pair of electrodes to form a single domain therein, and a second magnetic film formed between said first magnetic film and said magneto-resistance effect film so as to regulate a magnitude of magnetic coupling between said magneto-resistance effect film and said first magnetic film to a predetermined level which effects single domain formation for Barkhausen noise reduction while allowing magnetic moment rotation of said magneto-resistance effect film for signal detection sensitivity, said first magnetic film being a permanent magnet film, a magnitude of a spontaneous magnetization of said magneto-resistance effect film being largest, that of said first magnetic film being next, and that of said second magnetic film being smallest, wherein a thickness of said second magnetic film is smaller than that of said magneto-resistance effect film.

16. A magnetic disc apparatus comprising a magnetic head having a magneto-resistance effect film comprising a ferromagnetic thin film having an electrical resistance changing with a direction of magnetization for converting a magnetic signal into an electrical signal by use of a magneto-resistance effect and a pair of electrodes for supplying a signal detection current to said magneto-resistance effect film;

said apparatus further comprising a magnetic domain control layer arranged in contact with said magneto-resistance effect film in a region between said pair of electrodes, said magnetic domain control layer having an antiferromagnetic domain control layer for applying a substantially longitudinal biasing magnetic field to at least a magnetosensitive portion of said magneto-resistance effect film between said pair of electrodes to form a single domain thereon, and a magnetic film formed between said antiferromagnetic domain control layer and said magneto-resistance effect film so as to regulate a magnitude of magnetic coupling between said magneto-resistance effect film and said antiferromagnetic domain control layer to a predetermined level which effects single domain formation for Barkhausen noise reduction while allowing magnetic moment rotation of said magneto-resistance effect film for signal detection sensitivity, wherein a spontaneous magnetization of said magneto-resistance effect film being larger than that of said antiferromagnetic domain control layer, wherein a spontaneous magnetization of said magnetic film is larger than that of said antiferromagnetic film, and a thickness of said antiferromagnetic domain control layer is larger than that of said magneto-resistance effect film.

17. A magnetic disc apparatus comprising a magnetic head including a magneto-resistance effect film comprising a ferromagnetic thin film having an electrical resistance changing with a direction of magnetization for convening a magnetic signal into an electrical signal by use of a magneto-resistance effect and a pair of electrodes for supplying a signal detection current to said magneto-resistance effect film;

said apparatus further comprising a magnetic domain control layer arranged in contact with said magneto-resistance effect film in a region between said pair of electrodes, said magnetic domain control layer having a permanent magnet film for applying a substantially longitudinal biasing magnetic field to at least a magnetosensitive portion of said magneto-resistance effect film between said pair of electrodes to form a single domain therein, and a magnetic film formed between said permanent magnet film and said magneto-resistance effect film so as to regulate a magnitude of magnetic coupling between said magneto-resistance effect film and said permanent magnetic film to a predetermined level which effects single domain formation for Barkhausen noise reduction while allowing magnetic moment rotation of said magneto-resistance effect film for signal detection sensitivity, wherein a spontaneous magnetization of said magneto-resistance effect film being larger than that of said permanent magnet film, wherein a spontaneous magnetization of said permanent magnet film is larger than that of said magnetic film, and wherein a thickness of said magnetic film is smaller than that of said magneto-resistance effect film.

18. A magnetic disc apparatus comprising a magnetic head including an NiFe film comprising a ferromagnetic thin film having an electrical resistance changing with a direction of magnetization for converting a magnetic signal into an electrical signal by use of a magneto-resistance effect and a pair of electrodes for supplying a signal detection current to said NiFe film;

said apparatus further comprising a magnetic domain control layer arranged in contact with said NiFe film in a region between said pair of electrodes, said magnetic domain control layer having a first film selected of NiO and CoPt for applying a substantially longitudinal biasing magnetic field to said NiFe film to at least a magnetosensitive portion of said NiFe film between said pair of electrodes to form a single domain therein, and a second film of NiFeNb formed between said first film and said NiFe film so as to regulate a magnitude of magnetic coupling between said NiFe film and said first film to a predetermined level which effects single domain formation for Barkhausen noise reduction while allowing magnetic moment rotation of said NiFe film for signal detection sensitivity;

wherein a thickness of said second film is smaller than that of said NiFe film;

wherein said NiFe film and said second film are formed to have progressively smaller magnitudes of spontaneous magnetization in the stated order, and wherein a first magnetic exchange coupling between said NiFe film and said second film and a second magnetic exchange coupling between said second film and said first film are formed to control said single domain of said NiFe film.

* * * * *

UNITED STATES PATENT AND TRADEMARK OFFICE
CERTIFICATE OF CORRECTION

PATENT NO.   : 5,726,838
DATED        : March 10, 1998
INVENTOR(S)  : SOEYA et al.

It is certified that error appears in the above-indentified patent and that said Letters Patent is hereby corrected as shown below:

Title page, item [30] should read as follows:
[30] Foreign Application Priority Data

```
Sep. 18, 1991  [JP]  Japan ...................... 3-237842
Mar. 17, 1992  [JP]  Japan ...................... 4-059895
```

Signed and Sealed this

Fourth Day of August, 1998

Attest:

BRUCE LEHMAN

Attesting Officer

Commissioner of Patents and Trademarks